United States Patent
Inada et al.

(10) Patent No.: US 12,091,603 B2
(45) Date of Patent: *Sep. 17, 2024

(54) LIQUID CRYSTAL COMPOSITION, OPTICALLY ANISOTROPIC LAYER, OPTICAL FILM, POLARIZING PLATE, AND IMAGE DISPLAY DEVICE

(71) Applicant: FUJIFILM Corporation, Tokyo (JP)

(72) Inventors: Hiroshi Inada, Kanagawa (JP); Shunya Katoh, Kanagawa (JP); Yuki Nakamura, Kanagawa (JP); Yuko Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 17/697,519

(22) Filed: Mar. 17, 2022

(65) Prior Publication Data

US 2022/0220382 A1    Jul. 14, 2022

Related U.S. Application Data

(63) Continuation of application No. PCT/JP2020/036169, filed on Sep. 25, 2020.

(30) Foreign Application Priority Data

Sep. 27, 2019    (JP) .................. 2019-177720

(51) Int. Cl.
*C09K 19/20*    (2006.01)
*C09K 19/30*    (2006.01)
(Continued)

(52) U.S. Cl.
CPC ...... *C09K 19/2007* (2013.01); *C09K 19/3068* (2013.01); *C09K 19/3405* (2013.01);
(Continued)

(58) Field of Classification Search
CPC ....................................... C09K 19/30
See application file for complete search history.

(56) References Cited

U.S. PATENT DOCUMENTS

2004/0164275 A1    8/2004   Spawn et al.
2015/0277006 A1   10/2015   Takasago et al.
(Continued)

FOREIGN PATENT DOCUMENTS

CN    104950371 A    9/2015
CN    110023347 A    7/2019
(Continued)

OTHER PUBLICATIONS

Machine Translation of JP2018146636 (Year: 2023).*
(Continued)

*Primary Examiner* — Chanceity N Robinson
(74) *Attorney, Agent, or Firm* — Edwards Neils LLC; Jean C. Edwards, Esq.

(57) ABSTRACT

A liquid crystal composition containing a liquid crystal compound and a non-liquid crystal compound, in which both of the liquid crystal compound and the non-liquid crystal compound are compounds having any of aromatic rings selected from the group consisting of groups represented by predetermined formulae, and a ratio of a molecular weight of the non-liquid crystal compound to a molecular weight of the liquid crystal compound is 1 or less.

17 Claims, 1 Drawing Sheet

(51) Int. Cl.
    *C09K 19/34*        (2006.01)
    *G02B 5/30*         (2006.01)
(52) U.S. Cl.
    CPC ...... *C09K 19/3491* (2013.01); *C09K 19/3497* (2013.01); *G02B 5/3016* (2013.01); *G02B 5/3025* (2013.01); *C09K 2019/2035* (2013.01); *C09K 2019/2078* (2013.01)

(56) References Cited

U.S. PATENT DOCUMENTS

| | | |
|---|---|---|
| 2015/0277007 A1 | 10/2015 | Matsuyama et al. |
| 2015/0277010 A1 | 10/2015 | Aimatsu et al. |
| 2017/0260150 A1 | 9/2017 | Nose |
| 2019/0023986 A1 | 1/2019 | Yoshinari et al. |
| 2019/0264106 A1 | 8/2019 | Takahashi et al. |
| 2020/0369959 A1 | 11/2020 | Hayashi et al. |

FOREIGN PATENT DOCUMENTS

| | | |
|---|---|---|
| JP | 4741459 B2 | 8/2011 |
| JP | 2015-200877 A | 11/2015 |
| JP | 2016-027397 A | 2/2016 |
| JP | 2016-081035 A | 5/2016 |
| JP | 6387109 B2 | 9/2018 |
| JP | 2018146636 A * | 9/2018 |
| JP | 2018146637 A * | 9/2018 |
| JP | 2019-105851 A | 6/2019 |
| WO | 2017/170443 A1 | 10/2017 |
| WO | 2019/124090 A1 | 6/2019 |
| WO | 2019/160025 A1 | 8/2019 |

OTHER PUBLICATIONS

Machine Translation of JP 2018146637 (Year: 2023).*
Office Action, issued by the Japanese Patent Office on Dec. 6, 2022, in connection with Japanese Patent Application No. 2021-549018.
International Search Report issued in PCT/JP2020/036169 on Dec. 15, 2020.
Written Opinion issued in PCT/JP2020/036169 on Dec. 15, 2020.
International Preliminary Report on Patentability completed by WIPO on Mar. 15, 2022 in connection with International Patent Application No. PCT/JP2020/036169.
Office Action, issued by the State Intellectual Property Office of China on Jan. 6, 2024, in connection with Chinese Patent Application No. 202080066753.6.

* cited by examiner

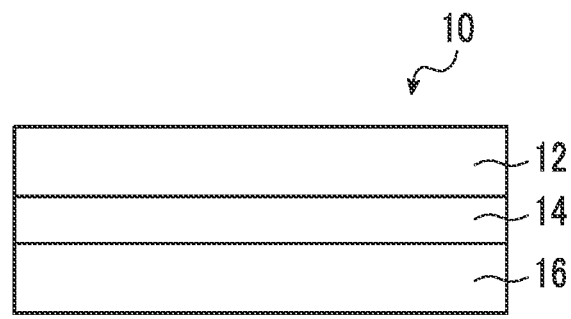

LIQUID CRYSTAL COMPOSITION, OPTICALLY ANISOTROPIC LAYER, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2020/036169 filed on Sep. 25, 2020, which was published under PCT Article 21(2) in Japanese, and which claims priority under 35 U.S.C. § 119(a) to Japanese Patent Application No. 2019-177720 filed on Sep. 27, 2019. The above applications are hereby expressly incorporated by reference, in their entirety, into the present application.

BACKGROUND OF THE INVENTION

1. Field of the Invention

The present invention relates to a liquid crystal composition, an optically anisotropic layer, an optical film, a polarizing plate, and an image display device.

2. Description of the Related Art

Optical films such as an optical compensation sheet and a phase difference film are used in various image display devices in order to eliminate image coloration or expand a viewing angle.

A stretched birefringent film has been used as the optical film, but in recent years, it has been proposed to use an optical film having an optically anisotropic layer consisting of a liquid crystal compound instead of the stretched birefringent film.

As such an optically anisotropic layer, for example, an optically anisotropic layer obtained by curing a composition containing a liquid crystal compound exhibiting reverse wavelength dispersion is described in JP2016-081035A ([Claim 1]).

In addition, an optically anisotropic layer obtained by curing a composition containing a reverse wavelength dispersible polymerizable liquid crystal compound and a polymerizable monomer is described in JP2019-105851A ([Claim 1]).

SUMMARY OF THE INVENTION

The present inventors have conducted investigations on the optically anisotropic layer described in JP2016-081035A, and have thus clarified that there is room for improvement in the light resistance.

The present inventors have conducted investigations on the optically anisotropic layer described in JP2019-105851A, and have thus clarified that there is room for improvement in the contrast of an image display device having the optically anisotropic layer.

Therefore, an object of the present invention is to provide a liquid crystal composition, with which an optically anisotropic layer having excellent light resistance can be formed and an image display device having an excellent contrast can be manufactured; and an optically anisotropic layer, an optical film, a polarizing plate, and an image display device.

The present inventors have conducted intensive examinations to accomplish the object, and as a result, they have found that by using a liquid crystal composition containing a liquid crystal compound having a predetermined aromatic ring and a non-liquid crystal compound having a predetermined aromatic ring, the light resistance of an optically anisotropic layer thus formed is improved, and the contrast of an image display device having the optically anisotropic layer is also good, thereby completing the present invention.

That is, the present inventors have found that the object can be accomplished by the following configurations.

[1] A liquid crystal composition comprising:
a liquid crystal compound; and
a non-liquid crystal compound,
in which both of the liquid crystal compound and the non-liquid crystal compound are compounds having any of aromatic rings selected from the group consisting of groups represented by Formulae (Ar-1) to (Ar-7) which will be described later, and
a ratio of a molecular weight of the non-liquid crystal compound to a molecular weight of the liquid crystal compound is 1 or less.

[2] The liquid crystal composition as described in [1],
in which the ratio of the molecular weight of the non-liquid crystal compound to the molecular weight of the liquid crystal compound is less than 1.

[3] The liquid crystal composition as described in [1] or [2],
in which the liquid crystal compound has reverse wavelength dispersibility.

[4] The liquid crystal composition as described in any one of [1] to [3],
in which the polymerizable liquid crystal compound is a compound represented by Formula (I) which will be described later.

[5] The liquid crystal composition as described in any one of [1] to [4],
in which the non-liquid crystal compound is a compound represented by Formula (II) which will be described later.

[6] The liquid crystal composition as described in [5],
in which g3 and g4 in Formula (II) which will be described later are 0, and $D^{11}$ and $D^{12}$ are single bonds.

[7] The liquid crystal composition as described in [5],
in which $G^3$ and $G^4$ in Formula (II) which will be described later each independently represent a divalent alicyclic hydrocarbon group having 5 to 20 carbon atoms, which may have a substituent,
provided that one or more of —$CH_2$—'s constituting the alicyclic hydrocarbon group may be substituted with —O—, —S—, or —NH—.

[8] The liquid crystal composition as described in [5],
in which $G^3$ and $G^4$ in Formula (II) which will be described later each independently represent an aromatic ring having 6 to 20 carbon atoms, which may have a substituent, and $D^9$ and $D^{10}$ each independently represent a divalent linking group including at least —$CR^1R^2$—,
here, $R^1$ and $R^2$ each independently represent a hydrogen atom, a fluorine atom, or an alkyl group having 1 to 12 carbon atoms.

[9] The liquid crystal composition as described in any one of [5] to [7],
in which $D^9$ and $D^{10}$ in Formula (II) which will be described later each independently represent —CO—, —O—, —S—, or a divalent linking group consisting of a combination of two or more of these groups.

[10] The liquid crystal composition as described in any one of [5] to [9], in which $SP^5$ and $SP^6$ in Formula (II) which will be described later each represent a linear or branched alkylene group having 1 to 12 carbon atoms, or a divalent linking group in which one or more of —$CH_2$—'s constituting the linear or branched alkylene group having 1 to 12 carbon atoms are substituted with —O—.

[11] The liquid crystal composition as described in any one of [5] to [10], in which both of $L^5$ and $L^6$ in Formula (II) which will be described later represent polymerizable groups.

[12] The liquid crystal composition as described in any one of [1] to [11], in which any of aromatic rings selected from the group consisting of groups represented by Formulae (Ar-1) to (Ar-7) which will be described later contained in the liquid crystal compound and any of aromatic rings selected from the group consisting of groups represented by Formulae (Ar-1) to (Ar-7) which will be described later contained in the non-liquid crystal compound have the same structure.

[13] An optically anisotropic layer obtained by polymerizing the liquid crystal composition as described in any one of [1] to [12].

[14] An optical film comprising the optically anisotropic layer as described in [13].

[15] A polarizing plate comprising:

the optical film as described in [14]; and a polarizer.

[16] An image display device comprising the optical film as described in [14] or the polarizing plate as described in [15].

According to the present invention, it is possible to provide a liquid crystal composition, with which an optically anisotropic layer having excellent light resistance can be formed and an image display device having an excellent contrast can be manufactured; and an optically anisotropic layer, an optical film, a polarizing plate, and an image display device.

BRIEF DESCRIPTION OF THE DRAWINGS

FIG. 1 is a schematic cross-sectional view showing an example of the optical film of an embodiment of the present invention.

DESCRIPTION OF THE PREFERRED EMBODIMENTS

Hereinafter, the present invention will be described in detail.

Descriptions on the constitutional requirements which will be described later are made based on representative embodiments of the present invention in some cases, but it should not be construed that the present invention is limited to such embodiments.

Furthermore, in the present specification, a numerical value range expressed using "to" means a range that includes the preceding and succeeding numerical values of "to" as the lower limit value and the upper limit value, respectively.

In addition, in the present specification, only one kind of the substance corresponding to each component may be used alone or two or more kinds thereof may also be used in combination, for each component. Here, in a case where the two or more kinds of substances are used in combination for each component, the content of the component refers to a total content of the substances used in combination unless otherwise specified.

In addition, in the present specification, the bonding direction of a divalent group (for example, —CO—NR—) as noted is not particularly limited unless the bonding position is specified, and for example, in a case where $D^1$ in Formula (I) which will be described later is —CO—NR—, $D^1$ may be either *1-CO—NR—*2 or *1-NR—CO-*2, in which *1 represents a bonding position to the $G^1$ side and *2 represents a bonding position to the $Ar^1$ side.

[Liquid Crystal Composition]

The liquid crystal composition of an embodiment of the present invention is a liquid crystal composition containing a liquid crystal compound and a non-liquid crystal compound.

In the present invention, both of the liquid crystal compound and the non-liquid crystal compound are any of aromatic rings selected from the group consisting of groups represented by Formulae (Ar-1) to (Ar-7) which will be described later (hereinafter also simply referred to as an "Ar core").

In addition, in the present invention, a ratio (molecular weight N/molecular weight L) of a molecular weight of the non-liquid crystal compound (hereinafter also simply referred to as a "molecular weight N") to a molecular weight of the liquid crystal compound (hereinafter also simply referred to as a "molecular weight L") is 1 or less.

Furthermore, in a case where the liquid crystal composition of the embodiment of the present invention contains two or more kinds of at least one of the liquid crystal compound or the non-liquid crystal compound, the liquid crystal composition may satisfy the ratio in relation to at least one set of the liquid crystal compound and the non-liquid crystal compound.

In the present invention, with a configuration where both of the liquid crystal compound and the non-liquid crystal compound contained in the liquid crystal composition are compounds having an Ar core and the ratio of the molecular weights (molecular weight N/molecular weight L) thereof is 1 or less, the light resistance of an optically anisotropic layer thus formed is improved and the contrast of an image display device having the optically anisotropic layer is improved.

A reason therefor is not specifically clear, but is presumed to be as follows by the present inventors.

That is, it is considered that with a configuration where the non-liquid crystal compound has the same Ar core as the liquid crystal compound, it serves as a compound having an absorption in a wavelength range in the same manner as that of the liquid crystal compound, and therefore, the light absorption of the liquid crystal compound is suppressed and the light resistance is improved, as compared with a case where there is no non-liquid crystal compound.

In addition, it is considered that with a configuration where the molecular weight of the non-liquid crystal compound is equal to or less than the molecular weight of the liquid crystal compound, the number of moles can thus be increased even with a small addition amount of the compound, and therefore, the contrast is improved.

In the present invention, the ratio between the molecular weights of the liquid crystal compound and the non-liquid crystal compound (molecular weight N/molecular weight L) is preferably less than 1, more preferably 0.7 or less, and still more preferably from 0.2 to 0.7 for a reason that the contrast of an image display device having an optically anisotropic layer thus formed is further improved.

Hereinafter, the respective components of the liquid crystal composition of the embodiment of the present invention will be described in detail.

[Liquid Crystal Compound]

The liquid crystal compound contained in the liquid crystal composition of the embodiment of the present invention is a liquid crystal compound having any of aromatic rings selected from the group consisting of the groups represented by Formulae (Ar-1) to (Ar-7).

Here, the liquid crystal compound means a compound exhibiting a liquid crystal state under a specific temperature condition. Furthermore, the specific temperature conditions are not particularly limited for a reason that they vary depending on a type of the liquid crystal compound. That is, it can be said that the liquid crystal compound is a compound having a temperature range exhibiting a liquid crystal state.

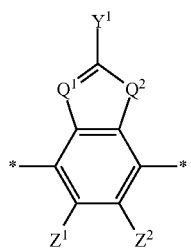

(Ar-1)

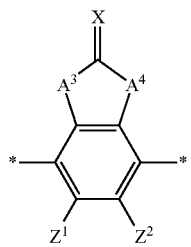

(Ar-2)

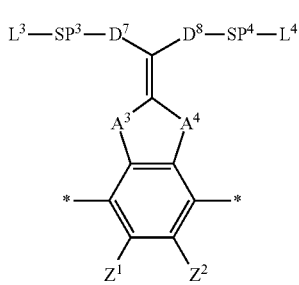

(Ar-3)

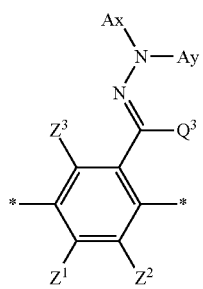

(Ar-4)

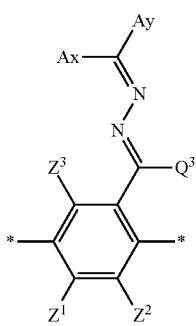

(Ar-5)

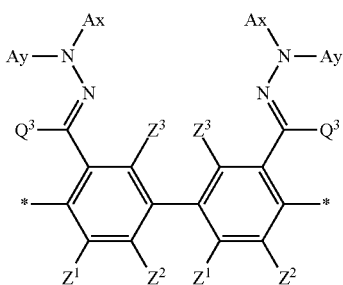

(Ar-6)

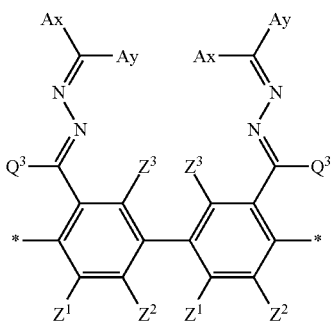

(Ar-7)

In Formulae (Ar-1) to (Ar-7), * represents a bonding position, that is, a bonding position to a portion other than the aromatic ring included in the liquid crystal compound.

In addition, in Formula (Ar-1), $Q^1$ represents N or CH, $Q^2$ represents —S—, —O—, or —N($R^6$)—, $R^6$ represents a hydrogen atom or an alkyl group having 1 to 6 carbon atoms, $Y^1$ represents an aromatic hydrocarbon group having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —$CH_2$—'s constituting the alicyclic hydrocarbon group may be substituted with —O—, —S—, or —NH—.

Here, specific examples of the alkyl group having 1 to 6 carbon atoms, represented by $R^6$, include a methyl group, an ethyl group, a propyl group, an isopropyl group, an n-butyl group, an isobutyl group, a sec-butyl group, a tert-butyl group, an n-pentyl group, and an n-hexyl group.

In addition, examples of the aromatic hydrocarbon group having 6 to 12 carbon atoms, represented by $Y^1$, include aryl groups such as a phenyl group, a 2,6-diethylphenyl group, and a naphthyl group.

Examples of the aromatic heterocyclic group having 3 to 12 carbon atoms, represented by $Y^1$, include heteroaryl groups such as a thienyl group, a thiazolyl group, a furyl group, and a pyridyl group.

Examples of the alicyclic hydrocarbon group having 6 to 20 carbon atoms, represented by $Y^1$, include a cyclohexylene group, a cyclopentylene group, a norbornene group, and an adamantylene group.

Examples of a substituent which may be contained in $Y^1$ include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkylcarbamate group, and among these, the alkyl group, the alkoxy group, the alkoxycarbonyl group, the alkylcarbonyloxy group, or the halogen atom is preferable.

As the alkyl group, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and the methyl group or the ethyl group is particularly preferable.

As the alkoxy group, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and the methoxy group or the ethoxy group is particularly preferable.

Examples of the alkoxycarbonyl group include a group in which an oxycarbonyl group (—O—CO— group) is bonded to the alkyl group exemplified above, and among these, the alkoxycarbonyl group is preferably a methoxycarbonyl group, an ethoxycarbonyl group, an n-propoxycarbonyl group, or an isopropoxycarbonyl group, and more preferably the methoxycarbonyl group.

Examples of the alkylcarbonyloxy group include a group in which a carbonyloxy group (—CO—O— group) is bonded to the alkyl group exemplified above, and among these, the alkylcarbonyloxy group is preferably a methylcarbonyloxy group, an ethylcarbonyloxy group, an n-propylcarbonyloxy group, or an isopropylcarbonyloxy group, and more preferably the methylcarbonyloxy group.

Examples of the halogen atom include a fluorine atom, a chlorine atom, a bromine atom, an iodine atom, and among these, the fluorine atom or the chlorine atom is preferable.

In addition, in Formulae (Ar-1) to (Ar-7), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 6 to 20 carbon atoms, a halogen atom, a cyano group, a nitro group, —$OR^7$, —$NR^8R^9$, —$SR^{10}$, —$COOR^{11}$, or —$COR^{12}$, where $R^7$ to $R^{12}$ each independently represent a hydrogen atom or an alkyl group having 1 to 6 carbon atoms, and $Z^1$ and $Z^2$ may be bonded to each other to form an aromatic ring.

Here, as the monovalent aliphatic hydrocarbon group having 1 to 20 carbon atoms, an alkyl group having 1 to 15 carbon atoms is preferable, an alkyl group having 1 to 8 carbon atoms is more preferable, and specifically, a methyl group, an ethyl group, an isopropyl group, a tert-pentyl group (1,1-dimethylpropyl group), a tert-butyl group, or a 1,1-dimethyl-3,3-dimethyl-butyl group is still more preferable, and the methyl group, the ethyl group, or the tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene; and polycyclic saturated hydrocarbon groups such as a bicyclo[2.2.1]heptyl group, a bicyclo[2.2.2]octyl group, a tricyclo[5.2.1.0$^{2.6}$]decyl group, a tricyclo[3.3.1.1$^{3.7}$]decyl group, a tetracyclo[6.2.1.1$^{3.6}$.0$^{2.7}$]dodecyl group, and an adamantyl group.

Specific examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly a phenyl group) is preferable.

Specific examples of the monovalent aromatic heterocyclic group having 6 to 20 carbon atoms include a 4-pyridyl group, a 2-furyl group, a 2-thienyl group, a 2-pyrimidinyl group, and a 2-benzothiazolyl group.

Examples of the halogen atom include a fluorine atom, a chlorine atom, a bromine atom, and an iodine atom, and among these, the fluorine atom, the chlorine atom, or the bromine atom is preferable.

On the other hand, specific examples of the alkyl group having 1 to 6 carbon atoms, represented by each of $R^7$ to $R^{10}$, include a methyl group, an ethyl group, a propyl group, an isopropyl group, an n-butyl group, an isobutyl group, a sec-butyl group, a tert-butyl group, an n-pentyl group, and an n-hexyl group.

In addition, as described above, $Z^1$ and $Z^2$ may be bonded to each other to form an aromatic ring, and examples of the structure in a case where $Z^1$ and $Z^2$ in Formula (Ar-1) are bonded to each other form an aromatic ring include a group represented by Formula (Ar-1a). Furthermore, in Formula (Ar-1a), * represents a bonding position, and examples of $Q^1$, $Q^2$, and $Y^1$ include the same ones as those described in Formula (Ar-1).

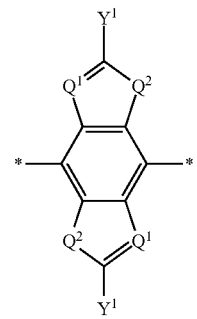

(Ar-1a)

In addition, in Formulae (Ar-2) and (Ar-3), $A^3$ and $A^4$ each independently represent a group selected from the group consisting of —O—, —N($R^{13}$)—, —S—, and —CO—, and $R^{13}$ represents a hydrogen atom or a substituent.

Examples of the substituent represented by $R^{13}$ include the same ones as the substituents which may be contained in $Y^1$ in Formula (Ar-1).

In addition, in Formula (Ar-2), X represents a hydrogen atom or a non-metal atom of Groups XIV to XVI, to which a substituent may be bonded.

Examples of the non-metal atom of Groups XIV to XVI represented by X include an oxygen atom, a sulfur atom, a nitrogen atom to which a hydrogen atom or a substituent is bonded [=N—$R^{N1}$, $R^{N1}$ represents a hydrogen atom or a substituent], and a carbon atom to which a hydrogen atom or a substituent is bonded [=C—$(R^{C1})_2$, $R^{C1}$ represents a hydrogen atom or a substituent].

Examples of the substituent include an alkyl group, an alkoxy group, an alkyl-substituted alkoxy group, a cyclic alkyl group, an aryl group (for example, a phenyl group and a naphthyl group), a cyano group, an amino group, a nitro group, an alkylcarbonyl group, a sulfo group, and a hydroxyl group.

In addition, in Formula (Ar-3), $D^7$ and $D^8$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms.

Here, examples of the divalent linking group represented by one aspect of $D^7$ and $D^8$ include —CO—, —O—, —CO—O—, —C(=S)O—, —$CR^1R^2$—, —$CR^1R^2$—$CR^1R^2$—, —O—$CR^1R^2$—, —$CR^1R^2$—O—$CR^1R^2$—, —CO—O—$CR^1R^2$—, —O—CO—$CR^1R^2$—, —$CR^1R^2$—O—CO—$CR^1R^2$—, —$CR^1R^2$—CO—O—$CR^1R^2$—, —$NR^5$—$CR^1R^2$—, and —CO—$NR^5$—. $R^1$, $R^2$, and $R^5$ each independently represent a hydrogen atom, a fluorine atom, or an alkyl group having 1 to 12 carbon atoms.

Among these, any of —CO—, —O—, and —CO—O— is preferable.

Moreover, in Formula (Ar-3), $SP^3$ and $SP^4$ each independently represent a single bond, a linear or branched alkylene group having 1 to 12 carbon atoms, or a divalent linking group in which one or more of —$CH_2$—'s constituting the linear or branched alkylene group having 1 to 12 carbon atoms are substituted with —O—, —S—, —NH—, —N(Q)-, or —CO—, where Q represents a substituent. Examples of the substituent include the same ones as the substituents which may be contained in $Y^1$ in Formula (Ar-1).

Here, suitable examples of the linear or branched alkylene group having 1 to 12 carbon atoms, represented by one aspect of $SP^3$ and $SP^4$, include a methylene group, an ethylene group, a propylene group, a butylene group, a pentylene group, a hexylene group, a methylhexylene group, and a heptylene group. Incidentally, $SP^1$ and $SP^2$ may be a divalent linking group in which one or more of —$CH_2$—'s constituting the linear or branched alkylene group having 1 to 12 carbon atoms are substituted with —O—, —S—, —NH—, —N(Q)-, or —CO—, as described above, and examples of the substituent represented by Q include the same ones as the substituents which may be contained in $Y^1$ in Formula (Ar-1).

Moreover, in Formula (Ar-3), $L^3$ and $L^4$ each independently represent a monovalent organic group.

Examples of the monovalent organic group represented by each of $L^3$ and $L^4$ include an alkyl group, an aryl group, and a heteroaryl group. The alkyl group may be linear, branched, or cyclic, but is preferably linear. The number of carbon atoms of the alkyl group is preferably 1 to 30, more preferably 1 to 20, and still more preferably 1 to 10. Further, the aryl group may be a monocycle or a polycycle, but is preferably the monocycle. The number of carbon atoms of the aryl group is preferably 6 to 25, and more preferably 6 to 10. Further, the heteroaryl group may be a monocycle or a polycycle. The number of heteroatoms constituting the heteroaryl group is preferably 1 to 3. The heteroatom constituting the heteroaryl group is preferably a nitrogen atom, a sulfur atom, or an oxygen atom. The number of carbon atoms of the heteroaryl group is preferably 6 to 18, and more preferably 6 to 12. In addition, the alkyl group, the aryl group, and the heteroaryl group may be unsubstituted or have a substituent. Examples of the substituent include the same ones as the substituents which may be contained in $Y^1$ in Formula (Ar-1).

Moreover, in Formulae (Ar-4) to (Ar-7), Ax represents an organic group having 2 to 30 carbon atoms, which has at least one aromatic ring selected from the group consisting of an aromatic hydrocarbon ring and an aromatic heterocyclic ring.

Furthermore, in Formulae (Ar-4) to (Ar-7), Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring.

Here, the aromatic ring in each of Ax and Ay may have a substituent, and Ax and Ay may be bonded to each other to form a ring.

In addition, $Q^3$ represents a hydrogen atom or an alkyl group having 1 to 6 carbon atoms, which may have a substituent.

Examples of each of Ax and Ay include the ones described in paragraphs [0039] to of WO2014/010325A.

In addition, specific examples of the alkyl group having 1 to 20 carbon atoms, represented by $Q^3$, include a methyl group, an ethyl group, a propyl group, an isopropyl group, an n-butyl group, an isobutyl group, a sec-butyl group, a tert-butyl group, an n-pentyl group, and an n-hexyl group, and examples of the substituent include the same ones as the substituents which may be contained in $Y^1$ in Formula (Ar-1).

In the present invention, the liquid crystal compound is preferably a liquid crystal compound having reverse wavelength dispersibility for a reason that the optical compensability is improved.

Here, in the present specification, the "liquid crystal compound having reverse wavelength dispersibility" means that in a case where an in-plane retardation (Re) value or a thickness-direction retardation (Rth) value at a specific wavelength (visible light range) of a phase difference film manufactured using the polymerizable liquid crystal compound is measured, the Re value or the Rth value is equal or higher as a measurement wavelength is increased.

In addition, in the present invention, the liquid crystal compound is preferably a compound represented by Formula (I) for a reason that the optical compensability is further improved. Furthermore, in Formula (I), Ar represents any of aromatic rings selected from the group consisting of the groups represented by Formulae (Ar-1) to (Ar-7) mentioned above. It should be noted that in a case where q1 in Formula (I) is 2, a plurality of Ar's may be the same as or different from each other.

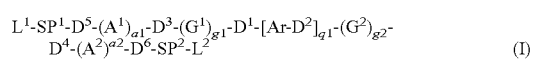

(I)

In Formula (I), a1, a2, g1, and g2 each independently represent 0 or 1. It should be noted that at least one of a1 or g1 represents 1, and at least one of a2 or g2 represents 1.

In addition, in Formula (I), q1 represents 1 or 2.

Moreover, in Formula (I), $D^1$, $D^2$, $D^3$, $D^4$, $D^5$, and $D^6$ each independently represent a single bond; —CO—, —O—, —S—, —C(=S)—, —$CR^1R^2$—, —$CR^3$=$CR^4$—, —$NR^5$—, or a divalent linking group consisting of a combination of two or more of these groups, and $R^1$ to $R^5$ each independently represent a hydrogen atom, a fluorine atom, or an alkyl group having 1 to 12 carbon atoms. It should be noted that in a case where q1 is 2, a plurality of $D^2$'s may be the same as or different from each other.

In addition, in Formula (I), $G^1$ and $G^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—.

In addition, in Formula (I), $A^1$ and $A^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—.

Furthermore, in Formula (I), $SP^1$ and $SP^2$ each independently represent a single bond, a linear or branched alkylene group having 1 to 12 carbon atoms, or a divalent linking group in which one or more of —$CH_2$—'s constituting the linear or branched alkylene group having 1 to 12 carbon atoms are substituted with —O—, —S—, —NH—, —N(Q)-, or —CO—, where Q represents a substituent.

In addition, in Formula (I), $L^1$ and $L^2$ each independently represent a monovalent organic group, and at least one of $L^1$ or $L^2$ represents a polymerizable group. It should be noted that in a case where Ar is the aromatic ring represented by Formula (Ar-3) mentioned above, at least one of $L^1$ or $L^2$, or $L^3$ or L in Formula (Ar-3) mentioned above represents a polymerizable group.

In Formula (I), it is preferable that any of a1, a2, g1, and g2 is 1 for a reason that the liquid crystal composition of the embodiment of the present invention is more likely to exhibit a liquid crystal state of a smectic phase.

In Formula (I), q1 is preferably 1.

In Formula (I), examples of the divalent linking group represented by one aspect of $D^1$, $D^2$, $D^3$, $D^4$, $D^5$, and $D^6$ include the same ones as those described in $D^7$ and $D^8$ in Formula (Ar-3).

Among these, any of —CO—, —O—, and —CO—O— is preferable.

In Formula (I), examples of the aromatic ring having 6 to 20 carbon atoms, represented by one aspect of $G^1$ and $G^2$, include an aromatic hydrocarbon ring such as a benzene ring, a naphthalene ring, an anthracene ring, and a phenanthroline ring; and an aromatic heterocyclic ring such as a furan ring, a pyrrole ring, a thiophene ring, a pyridine ring, a thiazole ring, and a benzothiazole ring, and among these, the benzene ring (for example, a 1,4-phenyl group) is preferable.

In Formula (I), the divalent alicyclic hydrocarbon group having 5 to 20 carbon atoms, represented by one aspect of $G^1$ and $G^2$, is preferably a 5- or 6-membered ring. In addition, the alicyclic hydrocarbon group may be saturated or unsaturated, but is preferably a saturated alicyclic hydrocarbon group. With regard to the divalent alicyclic hydrocarbon group represented by each of $G^1$ and $G^2$, reference can be made to, for example, the description in paragraph [0078] of JP2012-21068A, the contents of which are hereby incorporated by reference.

In the present invention, $G^1$ and $G^2$ in Formula (I) are each preferably a cycloalkane ring.

Specific examples of the cycloalkane ring include a cyclohexane ring, a cyclopeptane ring, a cyclooctane ring, a cyclododecane ring, and a cyclodocosane ring.

Among those, the cyclohexane ring is preferable, a 1,4-cyclohexylene group is more preferable, and a trans-1,4-cyclohexylene group is still more preferable.

Moreover, in Formula (I), examples of the substituent which may be contained in the aromatic ring having 6 to 20 carbon atoms or the divalent alicyclic hydrocarbon group having 5 to 20 carbon atoms in $G^1$ and $G^2$ include the same ones as the substituents which may be contained in $Y^1$ in Formula (Ar-1).

In Formula (I), examples of the aromatic ring having 6 to 20 or more carbon atoms, represented by one aspect of $A^1$ and $A^2$, include the same ones as those described in $G^1$ and $G^2$ in Formula (I).

In addition, in Formula (I), examples of the divalent alicyclic hydrocarbon group having 5 to 20 carbon atoms, represented by one aspect of $A^1$ and $A^2$, include the same ones as those described in $G^1$ and $G^2$ in Formula (I).

Moreover, examples of the substituent which may be contained in the aromatic ring having 6 to 20 carbon atoms or the divalent alicyclic hydrocarbon group having 5 to 20 carbon atoms in $A^1$ and $A^2$ include the same ones as the substituents which may be contained in $Y^1$ in Formula (Ar-1).

In Formula (I), examples of the linear or branched alkylene group having 1 to 12 carbon atoms, represented by one aspect of $SP^1$ and $SP^2$, include the same ones as those described in $SP^3$ and $SP^4$ in Formula (Ar-3).

In Formula (I), examples of the monovalent organic group represented by each of $L^1$ and $L^2$ include the same ones as those described in $L^3$ and $L^4$ in Formula (Ar-3).

In Formula (I), the polymerizable group represented by at least one of $L^1$ or $L^2$ is not particularly limited, but is preferably a polymerizable group which is radically polymerizable or cationically polymerizable.

A known radically polymerizable group can be used as the radically polymerizable group, and suitable examples thereof include an acryloyloxy group or a methacryloyloxy group. In this case, it is known that the acryloyloxy group generally has a high polymerization rate, and from the viewpoint of improvement of productivity, the acryloyloxy group is preferable but the methacryloyloxy group can also be used as the polymerizable group.

A known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among those, the alicyclic ether group or the vinyloxy group is suitable, and an epoxy group, an oxetanyl group, or the vinyloxy group is particularly preferable.

Particularly preferred examples of the polymerizable groups include a polymerizable group represented by any of Formulae (P-1) to (P-20).

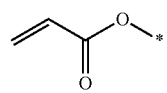

(P-1)

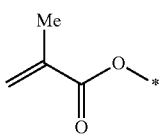
(P-2)

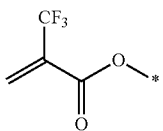
(P-3)

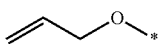
(P-4)

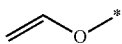
(P-5)

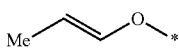
(P-6)

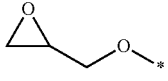
(P-7)

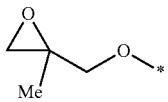
(P-8)

(P-9)

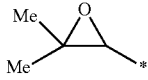
(P-10)

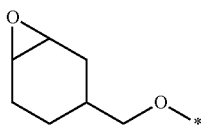
(P-11)

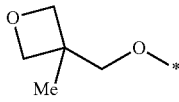
(P-12)

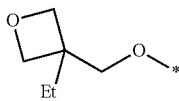
(P-13)

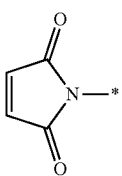
(P-14)

(P-15)

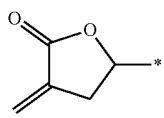
(P-16)

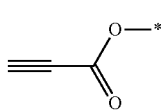
(P-17)

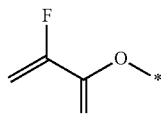
(P-18)

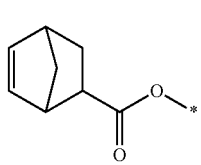
(P-19)

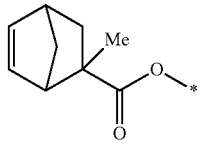
(P-20)

For a reason that the durability is improved, any of $L^1$ and $L^2$ in Formula (I) are preferably a polymerizable group, and more preferably an acryloyloxy group or a methacryloyloxy group in Formula (I).

Examples of the compound represented by Formula (I) include the compounds exhibiting a liquid crystal state of a smectic phase among the compounds represented by General Formula (I) described in JP2010-084032A (in particular, the compounds described in paragraph Nos. [0067] to [0073]), the compound represented by General Formula (II) described in JP2016-053709A (in particular, the compounds described in paragraph Nos. [0036] to [0043]), and the compounds represented by General Formula (I) described in JP2016-081035A (in particular, the compounds described in paragraph Nos. [0043] to [0055]).

In addition, suitable examples of the compound represented by Formula (I) include the compounds of Formula (I), in which Ar has a structure represented by Formulae Ar-1 to Ar-22, and specifically include compounds having side chain structures shown in Tables 1 to 3 below as K (side chain structure) in Formulae Ar-1 to Ar-22.

Furthermore, in Tables 1 to 3 below, "*" shown in the side chain structure of K represents a bonding position to an aromatic ring.

In addition, in the side chain structures shown in 2-2 in Table 2 below and 3-2 in Table 3 below, a group adjacent to each of the acryloyloxy group and the methacryloyl group represents a propylene group (a group in which a methyl group is substituted with an ethylene group), and represents a mixture of regioisomers in which the positions of the methyl groups are different.

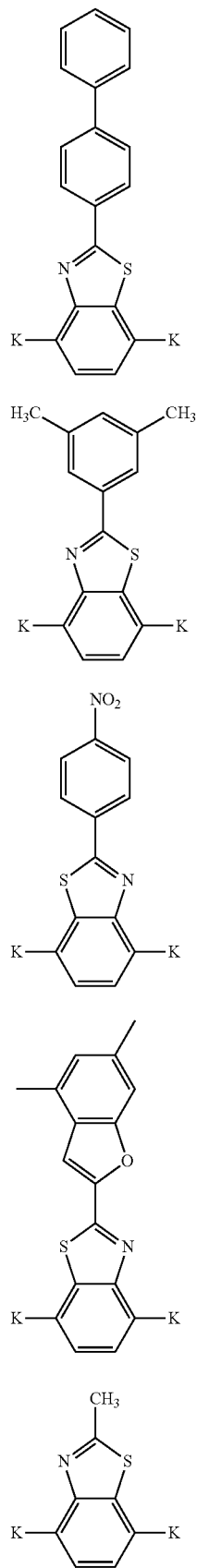
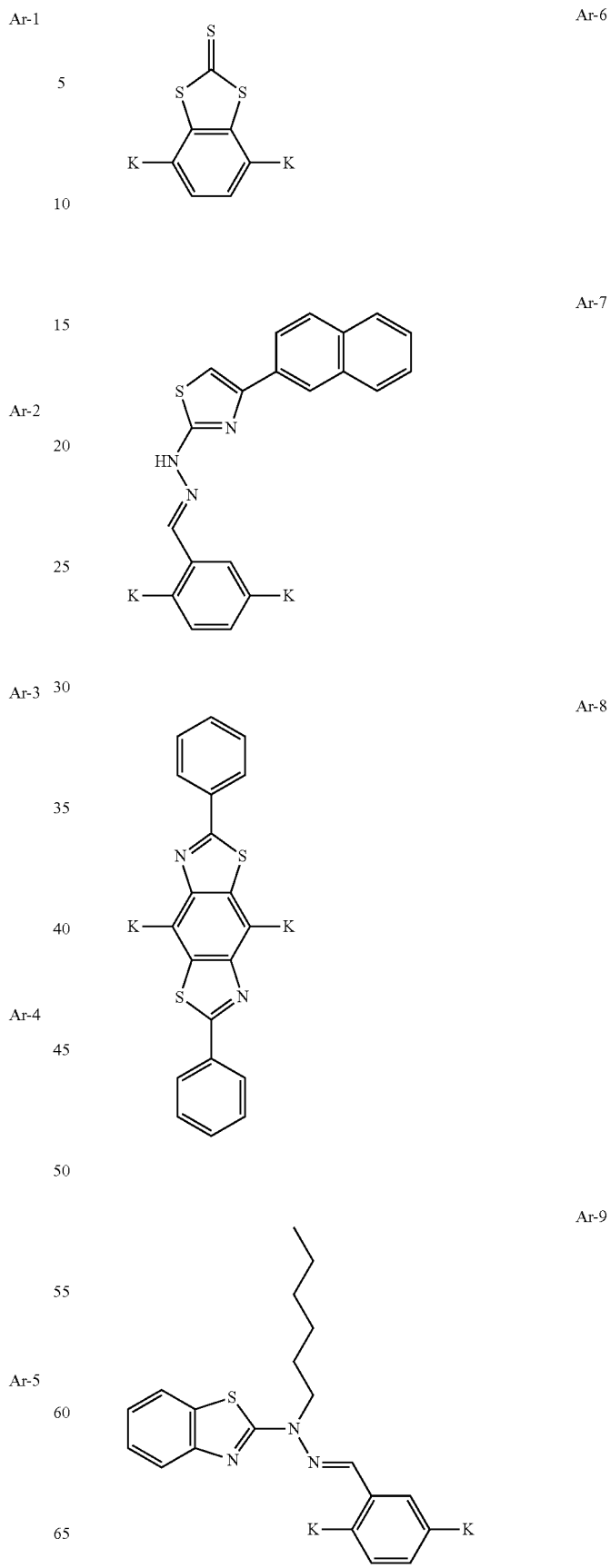

-continued
Ar-10
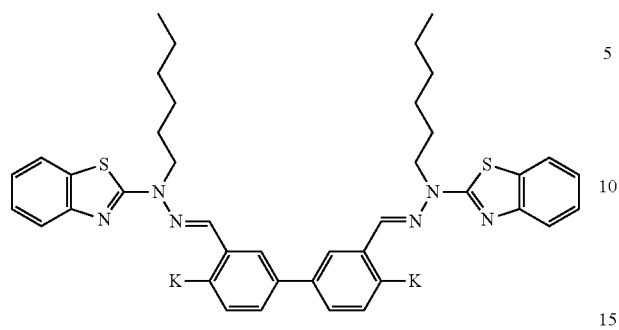
Ar-11
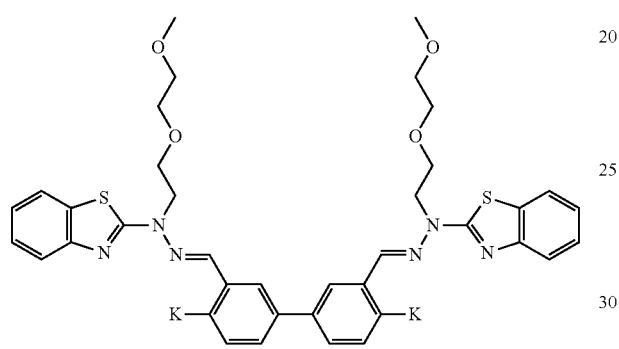
Ar-12
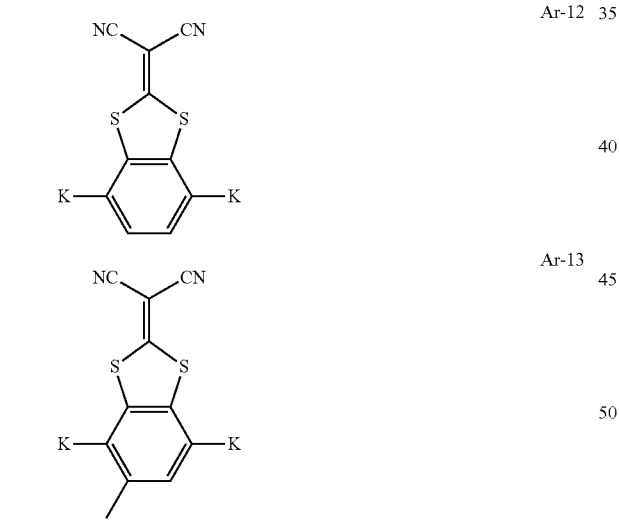
Ar-13
Ar-14
-continued
Ar-15
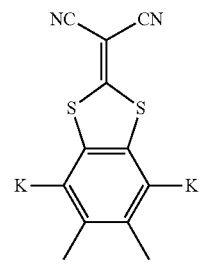
Ar-16
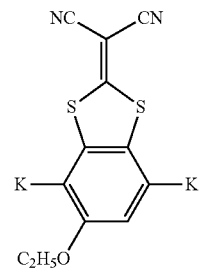
Ar-17
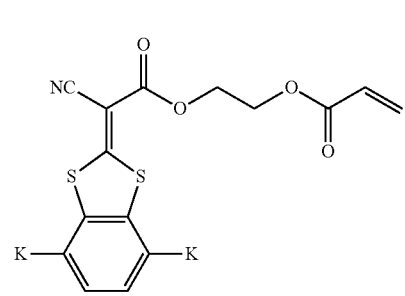
Ar-18
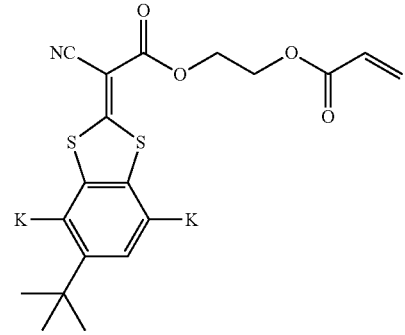

-continued
Ar-19
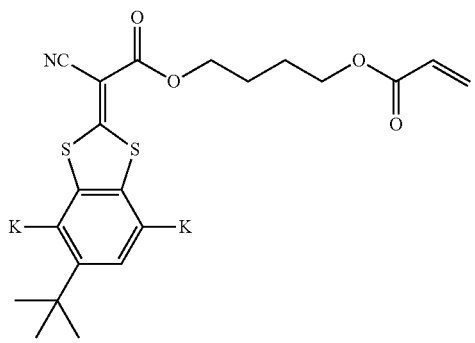
Ar-20
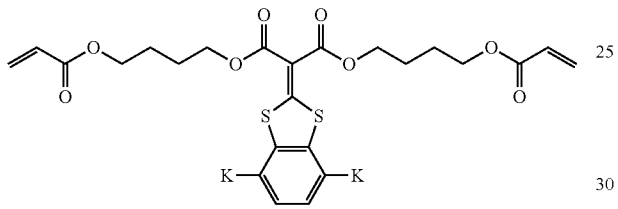
-continued
Ar-21
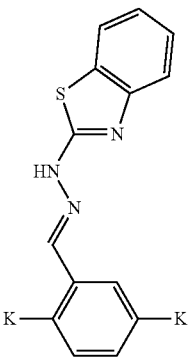
Ar-22
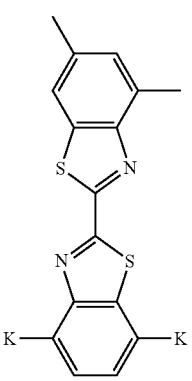
TABLE 1
K (side chain structure)
1-1 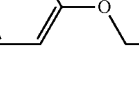
1-2 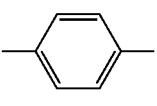
1-3 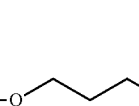
1-4 
1-5 

TABLE 1-continued

| | K (side chain structure) |
|---|---|
| 1-6 | [chemical structure] |

TABLE 2

| | K (side chain structure) |
|---|---|
| 2-1 | [chemical structure] |
| 2-2 | [chemical structure] |
| 2-3 | [chemical structure] |
| 2-4 | [chemical structure] |
| 2-5 | [chemical structure] |
| 2-6 | [chemical structure] |
| 2-7 | [chemical structure] |
| 2-8 | [chemical structure] |
| 2-9 | [chemical structure] |

TABLE 2-continued
K (side chain structure)
2-10 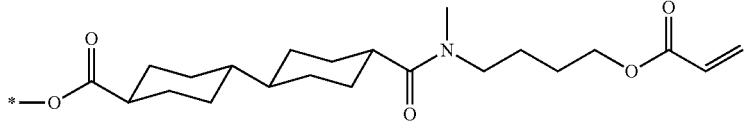
2-11 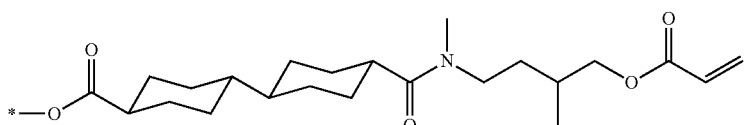
2-12 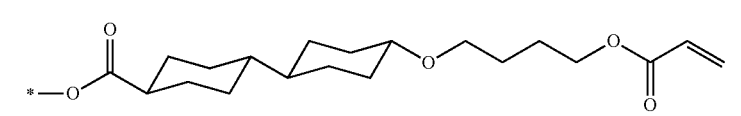
2-13 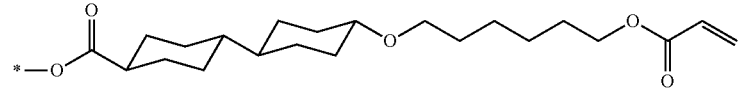
2-14 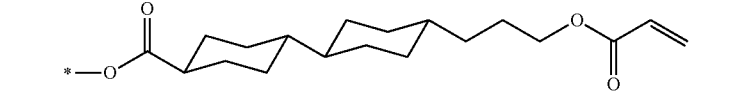
TABLE 3
K (side chain structure)
3-1 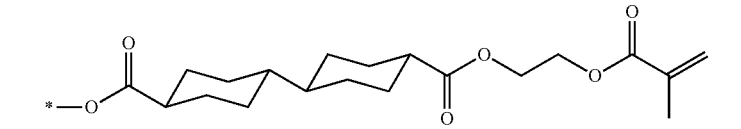
3-2 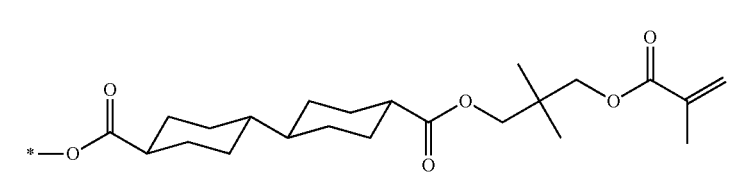
3-3 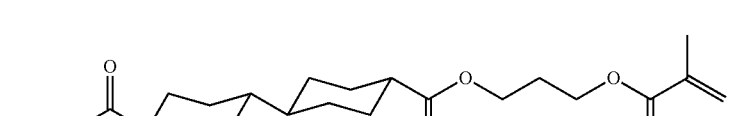
3-4 
3-5 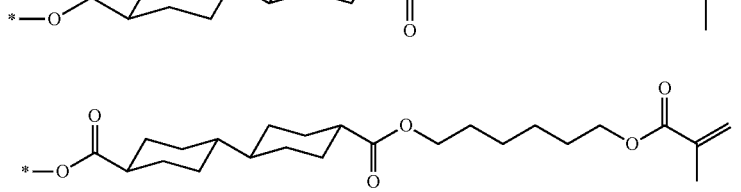

TABLE 3-continued

K (side chain structure)

3-6

3-7

3-8

3-9

3-10

3-11

3-12

3-13

3-14

In the present invention, it is preferable that the compound represented by Formula (I is a compound exhibiting a liquid crystal state of a smectic phase for a reason that the contrast of an image display device thus manufactured is improved.

[Non-Liquid Crystal Compound]

The non-liquid crystal compound contained in the liquid crystal composition of the embodiment of the present invention is a non-liquid crystal compound having any of aromatic rings selected from the group consisting of groups represented by Formulae (Ar-1) to (Ar-7) in a similar manner as in the above-mentioned liquid crystal compound.

Here, the non-liquid crystal compound means a compound which does not have a liquid crystal state even in a case where a temperature changes.

In the present invention, it is preferable that the non-liquid crystal compound is a compound represented by Formula (II) for a reason that the compatibility with the above-mentioned liquid crystal compound is improved.

$$L^5\text{-SP}^5\text{-D}^{11}\text{-(G}^3)_{g3}\text{-D}^9\text{-[Ar-D}^{10}]_{q2}\text{-(G}^4)_{g4}\text{-D}^{12}\text{-SP}^6\text{-L}^6 \qquad (II)$$

In Formula (II), g3 and g4 each independently represent 0 or 1.

In addition, in Formula (H), q2 represents 1 or 2.

Moreover, in Formula (I), $D^9$, $D^{10}$, $D^{11}$, and $D^{12}$ each independently represent a single bond; or —CO—, —O—, —S—, —C(=S)—, —CR$^1$R$^2$—, —CR$^3$=CR$^4$—, —NR$^5$—, or a divalent linking group consisting of a combination of two or more of these groups, and $R^1$ to $R^5$ each independently represent a hydrogen atom, a fluorine atom, or an alkyl group having 1 to 12 carbon atoms. It should be noted that in a case where q2 is 2, a plurality of $D^{10}$'s may be the same as or different from each other.

In addition, in Formula (II), $G^3$ and $G^4$ each independently represent an aromatic ring having 6 to 20 carbon atoms, which may have a substituent, or a divalent alicyclic hydrocarbon group having 5 to 20 carbon atoms, which may have a substituent, and one or more of —CH$_2$—'s constituting the alicyclic hydrocarbon group may be substituted with —O—, —S—, or —NH—.

Incidentally, in Formula (II), SP$^5$ and SP$^6$ each independently represent a single bond, a linear or branched alkylene group having 1 to 12 carbon atoms, or a divalent linking group in which one or more of —CH$_2$—'s constituting the linear or branched alkylene group having 1 to 12 carbon atoms are substituted with —O—, —S—, —NH—, —N(Q)-, or —CO—, where Q represents a substituent.

In addition, in Formula (I), $L^5$ and $L^6$ each independently represent a monovalent organic group.

Furthermore, in Formula (H), Ar represents any of aromatic rings selected from the group consisting of the groups represented by Formulae (Ar-1) to (Ar-7) mentioned above. It should be noted that in a case where q2 is 2, a plurality of Ar's may be the same as or different from each other.

In the present invention, it is preferable that g3 and g4 in Formula (II) are each 0 and $D^{11}$ and $D^{12}$ are each a single bond for a reason that the light resistance of an optically anisotropic layer thus formed is further improved. That is, the non-liquid crystal compound is preferably a compound represented by Formula (Ha).

(IIa)

In Formula (II), q2 is preferably 1.

In Formula (II), examples of the divalent linking group represented by one aspect of $D^9$, $D^{10}$, $D^{11}$, and $D^{12}$ include the same ones as those described in $D^7$ and $D^8$ in Formula (Ar-3) mentioned above.

In the present invention, for a reason that the light resistance of an optically anisotropic layer thus formed is further improved, $D^9$ and $D^{10}$ are each independently preferably —CO—, —O—, —S—, or a divalent linking group formed by combination of two or more of these, and more preferably any of —CO—, —O—, and —CO—O—.

In Formula (II), examples of $G^3$ and $G^4$ include the same ones as those described in $G^1$ and $G^2$ in Formula (I) mentioned above.

In the present invention, $G^3$ and $G^4$ in Formula (II) are each independently preferably a divalent alicyclic hydrocarbon group having 5 to 20 carbon atoms, which may have a substituent, and more preferably a cycloalkane ring for a reason that the light resistance of an optically anisotropic layer thus formed is further improved. Furthermore, one or more of —CH$_2$—'s constituting the alicyclic hydrocarbon group may be substituted with —O—, —S—, or —NH—.

Specific examples of the cycloalkane ring include a cyclohexane ring, a cyclopeptane ring, a cyclooctane ring, a cyclododecane ring, and a cyclodocosane ring.

Among those, the cyclohexane ring is preferable, a 1,4-cyclohexylene group is more preferable, and a trans-1,4-cyclohexylene group is still more preferable.

In addition, in the present invention, in a case where $G^3$ and $G^4$ in Formula (II) are each independently an aromatic ring having 6 to 20 carbon atoms, which may have a substituent, it is preferable that $D^9$ and $D^{10}$ are each independently a divalent linking group including at least —CR$^1$R$^2$— for a reason that the light resistance of an optically anisotropic layer thus formed is further improved. Furthermore, $R^1$ and $R^2$ each independently represent a hydrogen atom, a fluorine atom, or an alkyl group having 1 to 12 carbon atoms.

In Formula (II), examples of the linear or branched alkylene group having 1 to 12 carbon atoms, represented by one aspect of SP$^5$ and SP$^6$, include the same ones as those described in SP$^3$ and SP$^4$ in Formula (Ar-3) mentioned above.

In the present invention, it is preferable that SP$^5$ and SP$^6$ are each a linear or branched alkylene group having 1 to 12 carbon atoms or a divalent linking group in which one or more of —CH$_2$—'s constituting the linear or branched alkylene group having 1 to 12 carbon atoms are substituted with —O— for a reason that the compatibility with the above-mentioned liquid crystal compound is improved.

In Formula (II), examples of the monovalent organic group represented by each of $L^5$ and $L^6$ include the same ones as those described in $L^3$ and $L^4$ in Formula (Ar-3) mentioned above.

In the present invention, it is preferable that both of $L^5$ and $L^6$ in Formula (II) represents polymerizable groups for a reason that the durability of an optically anisotropic layer thus formed is improved.

Here, examples of the polymerizable group include the same ones as those exemplified as the polymerizable group represented by at least one of $L^1$ or $L^2$ in Formula (I), and among these, suitable examples of the polymerizable group include the polymerizable group represented by any of Formulae (P-1) to (P-20).

Suitable examples of the compound represented by Formula (II) include the compounds of Formula (II) in which Ar has a structure represented by Formulae Ar-1 to Ar-22, and specifically include compounds having side chain structures represented by the following K-1 to K-58 as K (side chain structure) in Formulae Ar-1 to Ar-22.

Furthermore, "*" shown in the side chain structures represented by the following K-1 to K-58 represents a bonding position to an aromatic ring. In addition, in the side chain structures represented by the following K-3, K-4, K-31, K-32, K-53 and K-54, a group adjacent to each of the acryloyloxy group and the methacryloyl group represents a propylene group (a group in which a methyl group is substituted with an ethylene group), and represents a mixture of regioisomers in which the positions of the methyl groups are different.

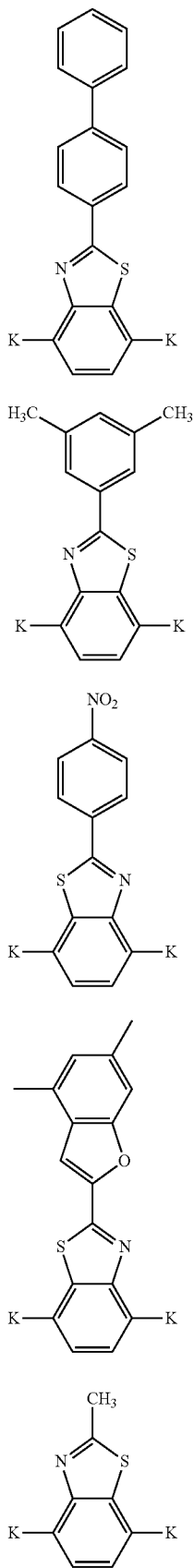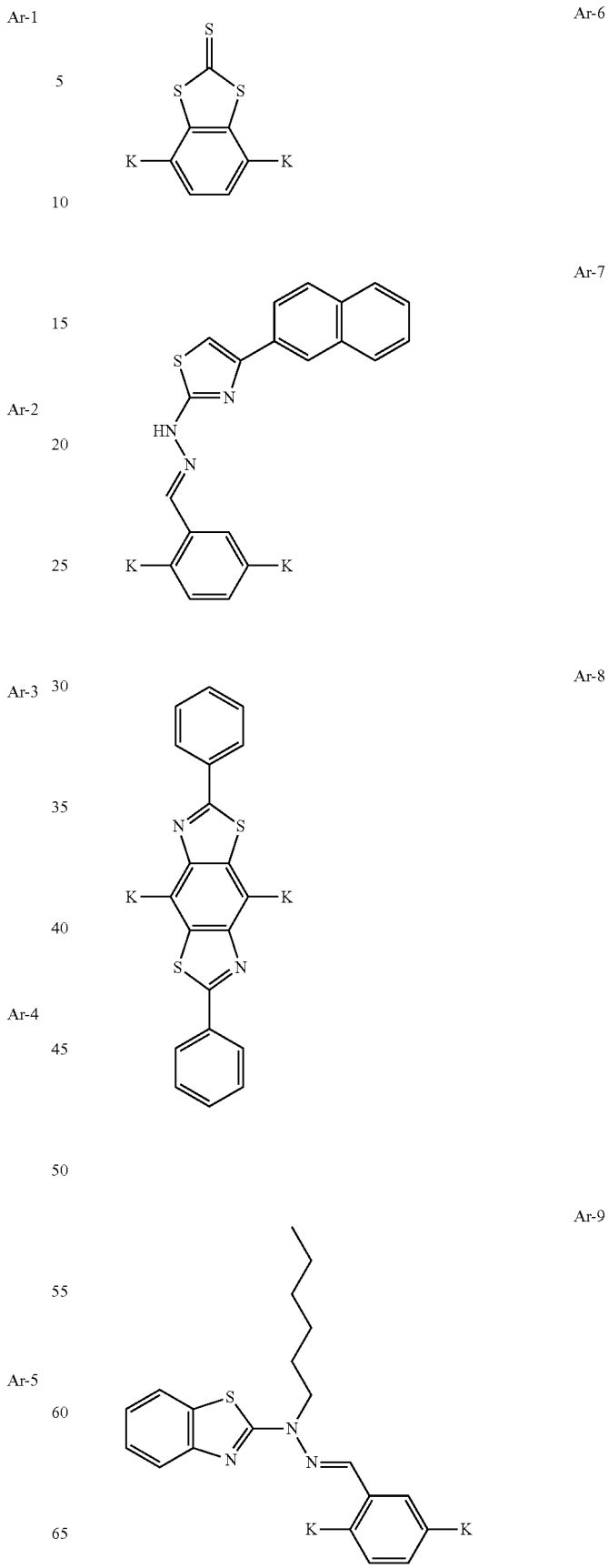

Ar-10
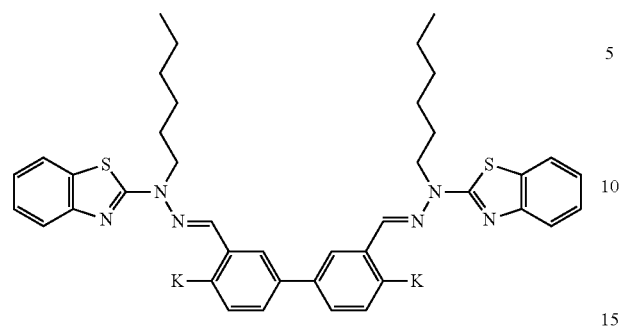
Ar-11
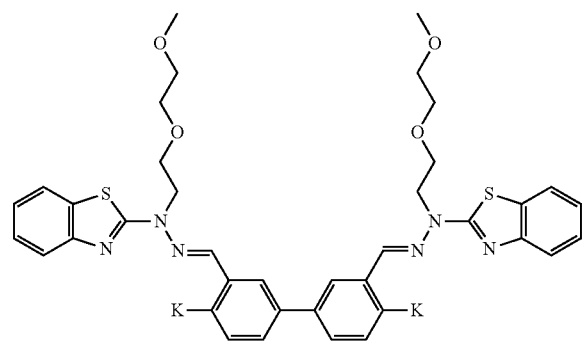
Ar-12
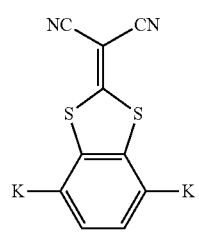
Ar-13
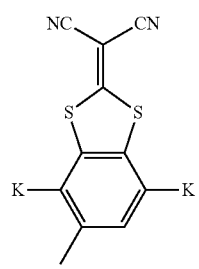
Ar-14
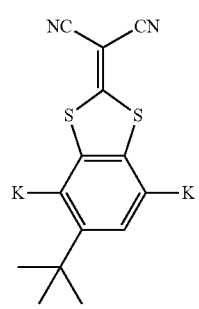
Ar-15
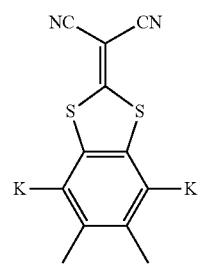
Ar-16
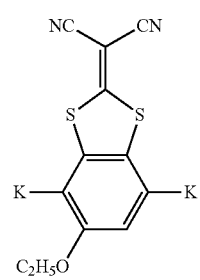
Ar-17
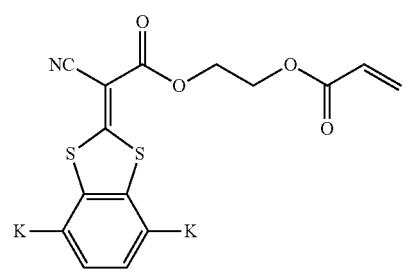
Ar-18
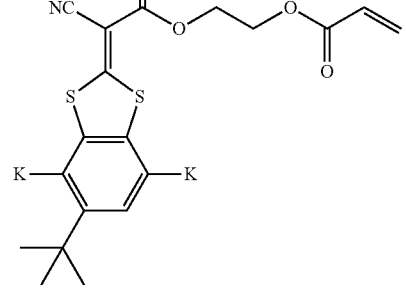
Ar-19
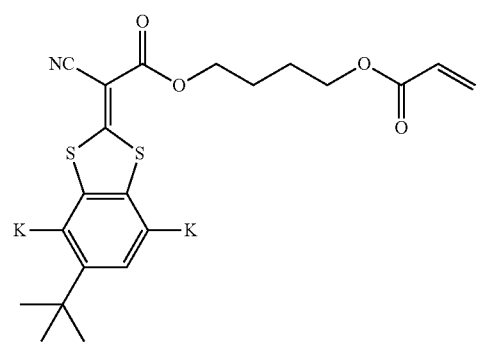

Ar-20
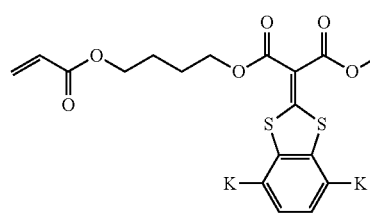
Ar-21
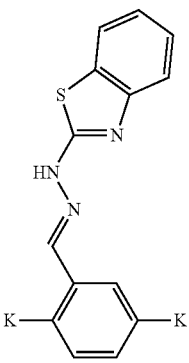
Ar-22
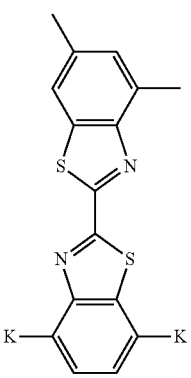
K-1
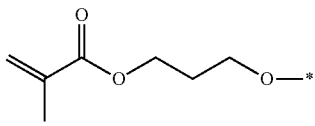
K-2
K-3
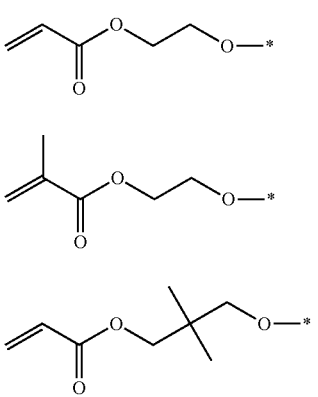
K-4
K-5
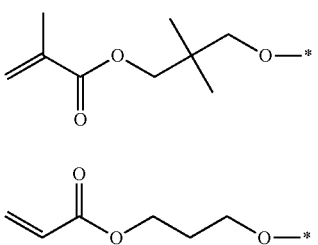
K-6
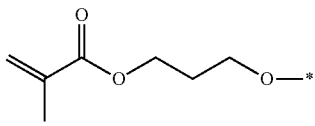
K-7
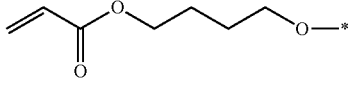
K-8
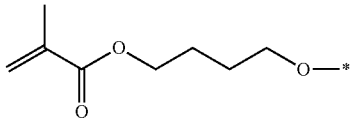
K-9
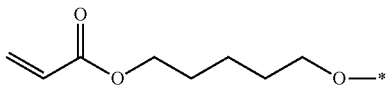
K-10
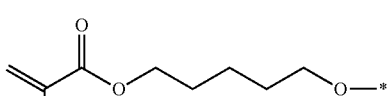
K-11
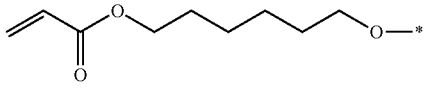
K-12
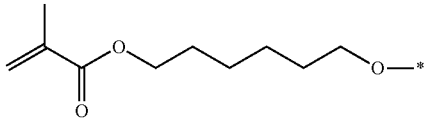
K-13
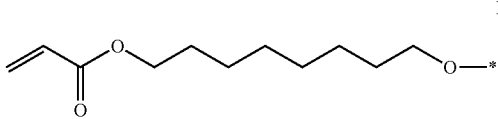
K-14
K-15
K-16
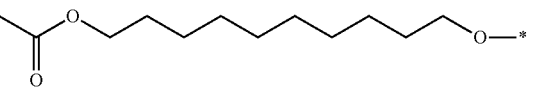
K-17
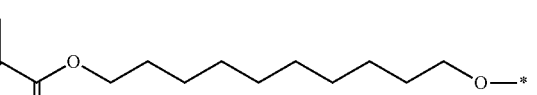

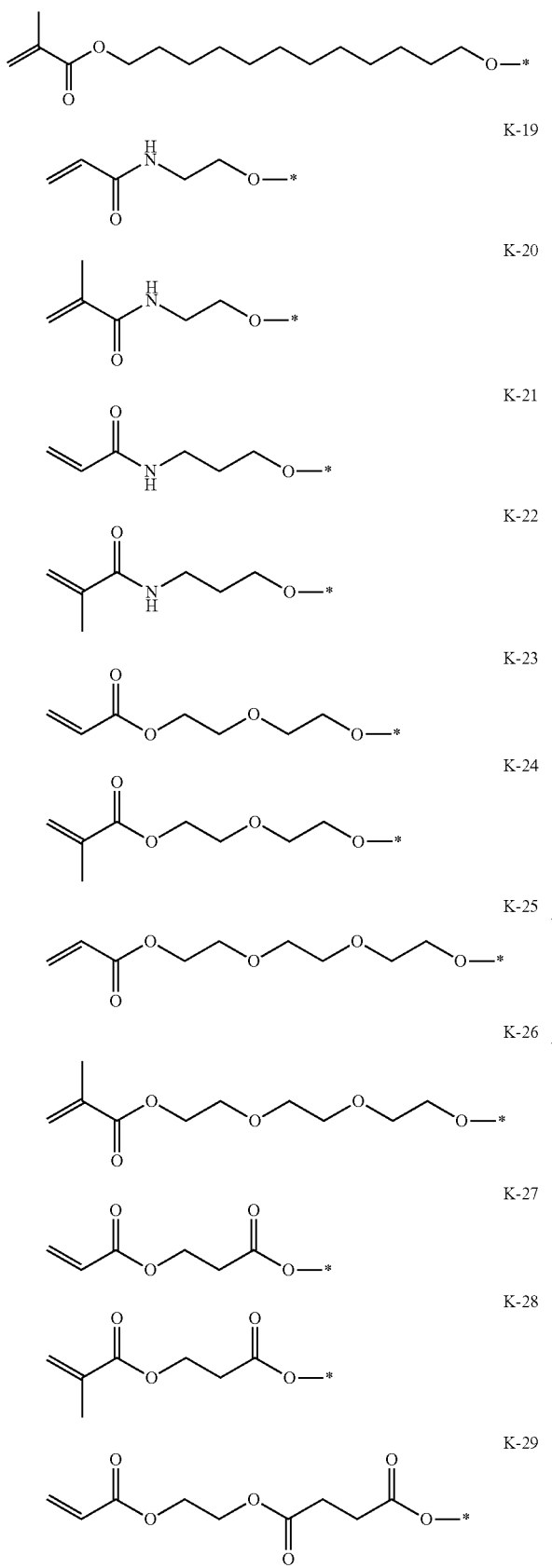
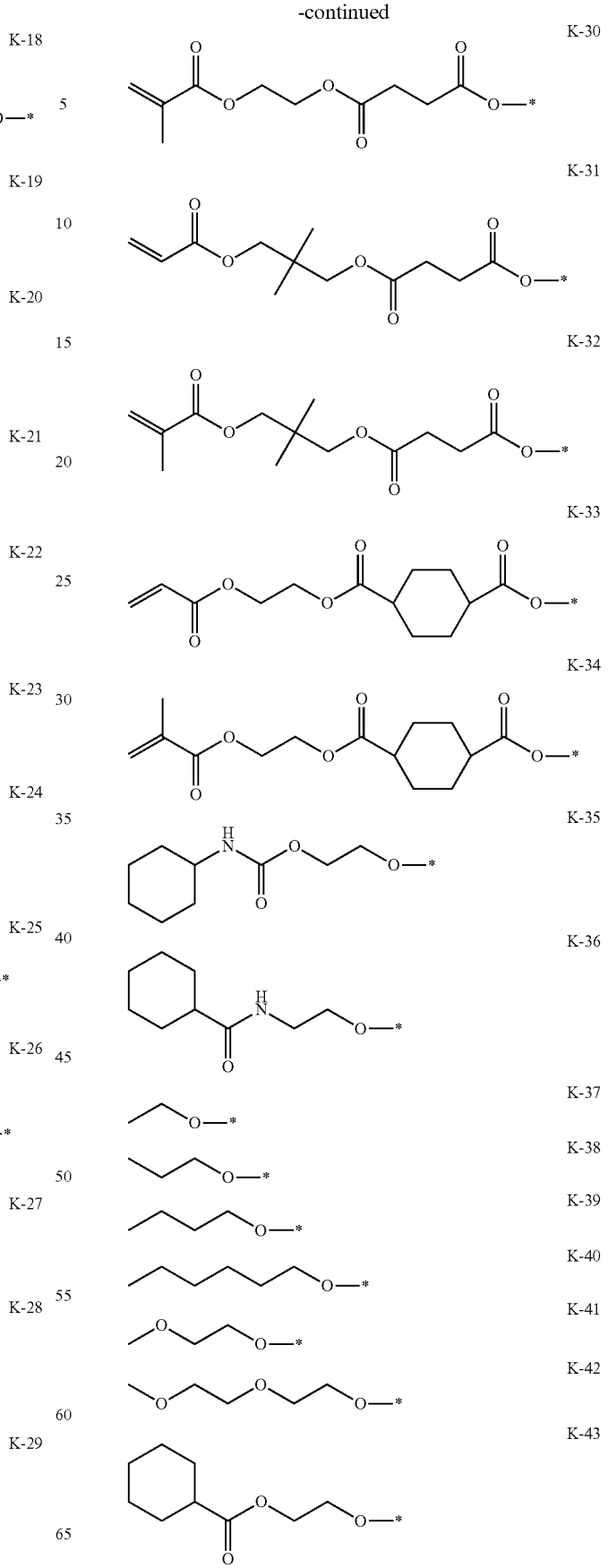

K-44
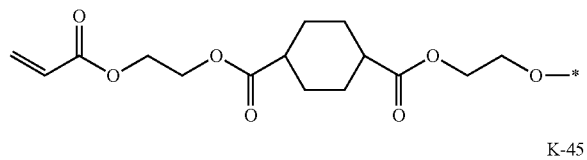

K-45
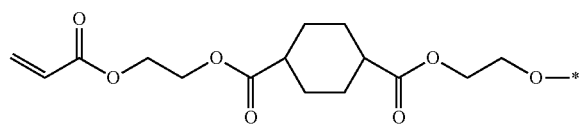

K-46
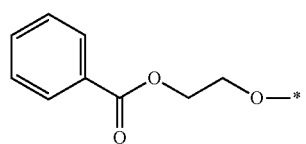

K-47
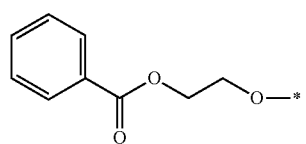

K-48
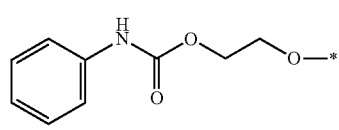

K-49
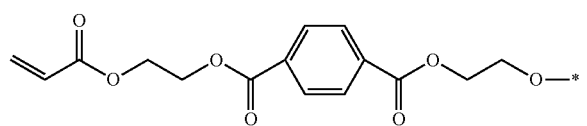

K-50
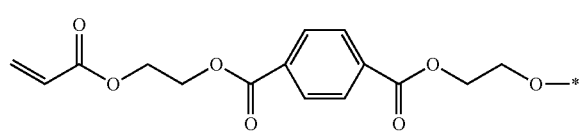

K-51
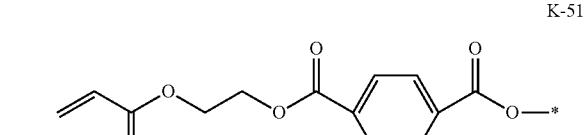

K-52
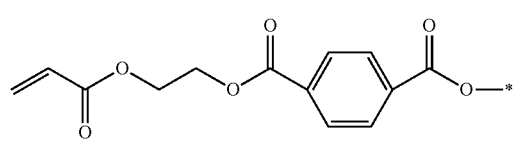

K-53
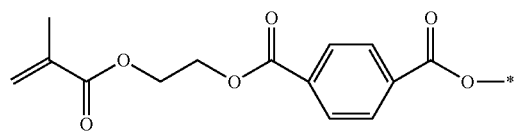

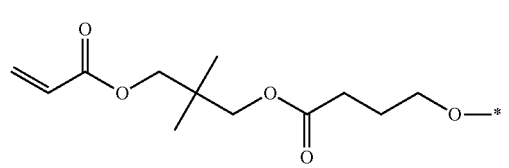

K-54
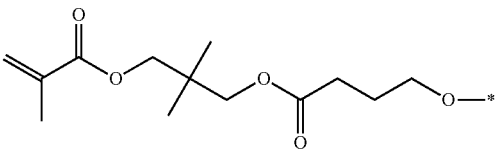

K-55
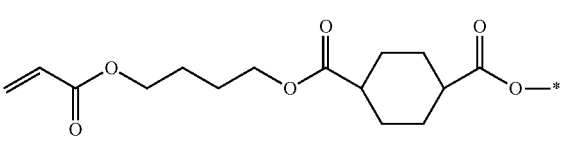

K-56
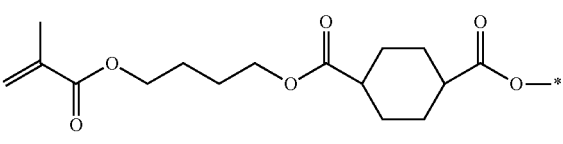

K-57
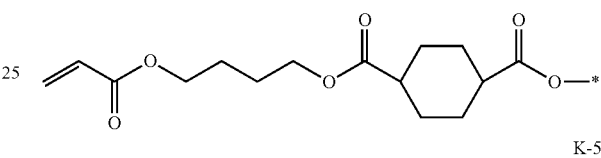

K-58
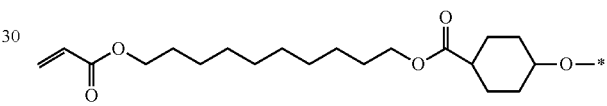

In the present invention, a content of the non-liquid crystal compound is preferably set to 1 to 50 parts by mass, and more preferably set to 2 to 30 parts by mass with respect to 100 parts by mass of to the liquid crystal compound for a reason that the surface condition of an optically anisotropic layer thus formed is improved and the contrast of an image display device having the optically anisotropic layer is improved.

In the present invention, for a reason that the light resistance of an optically anisotropic layer thus formed is further improved, it is preferable that any of the aromatic rings selected from the group consisting of groups represented by Formulae (Ar-1) to (Ar-7) contained in the liquid crystal compound and any of the aromatic rings selected from the group consisting of groups represented by Formulae (Ar-1) to (Ar-7) contained in the non-liquid crystal compound have the same structure.

Furthermore, in a case where the liquid crystal composition of the embodiment of the present invention contains two or more kinds of at least one of the liquid crystal compound or the non-liquid crystal compound, the liquid crystal composition may have an aromatic ring having the same structure in relation to at least one set of the liquid crystal compound and the non-liquid crystal compound.

[Polyfunctional Liquid Crystal Compound]

For a reason that the surface condition of an optically anisotropic layer thus formed is improved, it is preferable that the liquid crystal composition of the embodiment of the present invention contains a polyfunctional liquid crystal compound having three or more polymerizable groups, in addition to the above-mentioned liquid crystal compound.

Here, examples of the polymerizable group contained in the polyfunctional liquid crystal compound include the same ones as the polymerizable groups which are radically polymerizable or cationically polymerizable, described in the above-mentioned liquid crystal compound, and among these, the polymerizable group represented by any of Formulae (P-1) to (P-20) are preferable.

Examples of the polyfunctional liquid crystal compounds include the compound represented by Formula (M3) described in paragraph [0033] of JP2014-077068A, and more specifically, the specific examples described in paragraphs [0053] to [0055] of the same publication.

In addition, other examples of the polyfunctional liquid crystal compound include compounds 8, 29, 59 to 61, 64, 65, and 69 among the compounds described in paragraphs [0027] to [0033] of JP2016-053149A.

In the present invention, in a case where the polyfunctional liquid crystal compound is contained, a content of the polyfunctional liquid crystal compound is preferably 1 to 100 parts by mass, and more preferably 5 to 50 parts by mass with respect to 100 parts by mass of the liquid crystal compound.

[Polymerization Initiator]

The liquid crystal composition of the embodiment of the present invention preferably contains a polymerization initiator.

The polymerization initiator to be used is preferably a photopolymerization initiator capable of initiating a polymerization reaction upon irradiation with ultraviolet rays.

Examples of the photopolymerization initiator include α-carbonyl compounds (described in each of the specifications of U.S. Pat. Nos. 2,367,661A and 2,367,670A), acyloin ethers (described in the specification of U.S. Pat. No. 2,448,828A), α-hydrocarbon-substituted aromatic acyloin compounds (described in the specification of U.S. Pat. No. 2,722,512A), multinuclear quinone compounds (described in each of the specifications of U.S. Pat. Nos. 3,046,127A and 2,951,758A), combinations of a triarylimidazole dimer and a p-aminophenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and acyl phosphine oxide compounds (described in JP1988-40799B (JP-S63-40799B), JP1993-29234B (JP-H05-29234B), JP1998-95788A (JP-H10-95788A), and JP1998-29997A (JP-H10-29997A)).

In addition, in the present invention, it is also preferable that the polymerization initiator is an oxime-type polymerization initiator, and specific examples of the polymerization initiator include the initiators described in paragraphs [0049] to [0052] of WO2017/170443A.

[Solvent]

It is preferable that the liquid crystal composition of the embodiment of the present invention contains a solvent from the viewpoint of workability for forming an optically anisotropic layer, and the like.

Specific examples of the solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide), and these may be used singly or in combination of two or more kinds thereof.

[Leveling Agent]

It is preferable that the liquid crystal composition of the embodiment of the present invention contains a leveling agent from the viewpoint that the surface of an optically anisotropic layer thus formed is maintained smooth and the alignment is easily controlled.

Such a leveling agent is preferably a fluorine-based leveling agent or a silicon-based leveling agent for a reason that it has a high leveling effect on the addition amount, and the leveling agent is more preferably a fluorine-based leveling agent from the viewpoint that it is less likely to cause bleeding (bloom or bleed).

Specific examples of the leveling agent include the compounds described in paragraphs [0079] to [0102] of JP2007-069471A, the compound represented by General Formula (I) described in JP2013-047204A (in particular, the compounds described in paragraphs [0020] to [0032]), the compound represented by General Formula (I) described in JP2012-211306A (in particular, the compounds described in paragraphs [0022] to [0029]), the liquid crystal alignment accelerator represented by General Formula (I) described in JP2002-129162A (in particular, the compounds described in paragraphs [0076] to [0078] and [0082] to [0084]), and the compounds represented by General Formulae (I), (II), and (III) described in JP2005-099248A (in particular, the compounds described in paragraphs [0092] to [0096]). In addition, the leveling agent may also function as an alignment control agent which will be described later.

[Alignment Control Agent]

The liquid crystal composition of the embodiment of the present invention can contain an alignment control agent, as desired.

With the alignment control agent, various alignment states such as homeotropic alignment (vertical alignment), tilt alignment, hybrid alignment, and cholesteric alignment can be formed, in addition to the homogeneous alignment, and specific alignment states can be controlled and achieved more uniformly and more accurately.

As an alignment control agent which accelerates the homogeneous alignment, for example, a low-molecular-weight alignment control agent or a high-molecular-weight alignment control agent can be used.

With regard to the low-molecular-weight alignment control agent, reference can be made to the description in, for example, paragraphs [0009] to [0083] of JP2002-20363A, paragraphs [0111] to [0120] of JP2006-106662A, and paragraphs [0021] to [0029] of JP2012-211306A, the contents of which are hereby incorporated by reference.

In addition, with regard to the high-molecular-weight alignment control agent, reference can be made to the description in, for example, paragraphs [0021] to [0057] of JP2004-198511A and paragraphs [0121] to [0167] of JP2006-106662A, the contents of which are hereby incorporated by reference.

Furthermore, examples of the alignment control agent that forms or accelerates the homeotropic alignment include a boronic acid compound and an onium salt compound, and specifically, reference can be made to the compounds described in paragraphs [0023] to [0032] of JP2008-225281A, paragraphs [0052] to [0058] of JP2012-208397A, paragraphs [0024] to [0055] of JP2008-026730A, paragraphs [0043] to [0055] of JP2016-193869A, and the like, the contents of which are hereby incorporated by reference.

On the other hand, the cholesteric alignment can be achieved by adding a chiral agent to the liquid crystal composition of the embodiment of the present invention, and it is possible to control the direction of revolution of the cholesteric alignment by its chiral direction.

Incidentally, it is possible to control the pitch of the cholesteric alignment in accordance with the alignment regulating force of the chiral agent.

In a case where an alignment control agent is contained, a content thereof is preferably 0.01% to 10% by mass, and more preferably 0.05% to 5% by mass with respect to the mass of the total solid content of the composition. In a case where the content is within the range, it is possible to obtain a cured product which has no precipitation or phase separation, alignment defects, or the like, and is uniform and highly transparent while achieving a desired alignment state.

[Other Components]

The liquid crystal composition of the embodiment of the present invention may contain components other than the above-mentioned components, and examples of such other components include a surfactant, a tilt angle control agent, an alignment assistant, a plasticizer, and a crosslinking agent.

[Optically Anisotropic Layer]

An optically anisotropic layer of an embodiment of the present invention is an optically anisotropic layer obtained by polymerizing the above-mentioned liquid crystal composition of the embodiment of the present invention.

Examples of a method for forming the optically anisotropic layer include a method in which the above-mentioned liquid crystal composition of the embodiment of the present invention is used to cause a desired alignment state, which is then immobilized by polymerization.

Here, the polymerization conditions are not particularly limited, but in the polymerization by irradiation with light, ultraviolet rays are preferably used. The irradiation dose is preferably 10 mJ/cm² to 50 J/cm², more preferably 20 mJ/cm² to 5 J/cm², still more preferably 30 mJ/cm² to 3 J/cm², and particularly preferably 50 mJ/cm² to 1,000 mJ/cm². In addition, the polymerization may be carried out under a heating condition in order to accelerate the polymerization reaction.

In addition, in the present invention, the optically anisotropic layer can be formed on any of supports in the optical film of the embodiment of the present invention which will be described later or a polarizer in the polarizing plate of an embodiment of the present invention which will be described later.

The optically anisotropic layer of the embodiment of the present invention is preferably an optically anisotropic layer satisfying Formula (III) or Formula (IV).

$$0.50 < Re(450)/Re(550) < 1.00 \quad \text{(III)}$$

$$0.50 < Rth(450)/Rth(550) < 1.00 \quad \text{(IV)}$$

Here, in Expression (III), Re(450) represents an in-plane retardation at a wavelength of 450 nm of the optically anisotropic layer, and Re(550) represents an in-plane retardation at a wavelength of 550 nm of the optically anisotropic layer. In addition, in Formula (IV), Rth(450) represents a thickness-direction retardation of the optically anisotropic layer at a wavelength of 450 nm, and Rth(550) represents a thickness-direction retardation of the optically anisotropic layer at a wavelength of 550 nm. In addition, in the present specification, in a case where the measurement wavelength of the retardation is not specified, the measurement wavelength is 550 nm.

Furthermore, the values of the in-plane retardation and the thickness-direction retardation refer to values measured with light at the measurement wavelength using AxoScan OPMF-1 (manufactured by Opto Science, Inc.).

Specifically, by inputting the average refractive index ((Nx+Ny+Nz)/3) and the film thickness (d (μm)) to AxoScan OPMF-1, it is possible to calculate:

Slow Axis Direction (°)

$$Re(\lambda) = R0(\lambda)$$

$$Rth(\lambda) = ((nx + ny)/2 - nz) \times d.$$

In addition, R0(λ) is expressed in a numerical value calculated with AxoScan OPMF-1, but means Re(λ).

In addition, such an optically anisotropic layer is preferably a positive A plate or a positive C plate, and more preferably the positive C plate.

Here, the positive A plate (A plate which is positive) and the positive C plate (C plate which is positive) are defined as follows.

In a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz, the positive A plate satisfies the relationship of Expression (A1) and the positive C plate satisfies the relationship of Expression (C1). In addition, the positive A plate has an Rth showing a positive value and the positive C plate has an Rth showing a negative value.

$$nx > ny \approx nz \quad \text{Expression (A1)}$$

$$nz > nx \approx ny \quad \text{Expression (C1)}$$

Furthermore, the symbol, "≈", encompasses not only a case where the both sides are completely the same as each other but also a case where the both are substantially the same as each other.

The expression, "substantially the same", means that with regard to the positive A plate, for example, a case where (ny−nz)×d (in which d is the thickness of a film) is −10 to 10 nm, and preferably −5 to 5 nm is also included in "ny≈nz", and a case where (nx−nz)×d is −10 to 10 nm, and preferably −5 to 5 nm is also included in "nx≈nz". In addition, with regard to the positive C plate, for example, a case where (nx−ny)×d (in which d is the thickness of a film) is 0 to 10 nm, and preferably 0 to 5 nm is also included in "nx≈ny".

In a case where the optically anisotropic layer is a positive A plate, the Re(550) is preferably 100 to 180 nm, more preferably 120 to 160 nm, still more preferably 130 to 150 nm, and particularly preferably 130 to 140 nm, from the viewpoint that the optically anisotropic layer functions as a λ/4 plate.

Here, the "λ/4 plate" is a plate having a λ/4 function, specifically, a plate having a function of converting a linearly polarized light at a certain specific wavelength into a circularly polarized light (or converting a circularly polarized light to a linearly polarized light).

[Optical Film]

The optical film of an embodiment of the present invention is an optical film having the optically anisotropic layer of the embodiment of the present invention.

FIG. 1 is a schematic cross-sectional view showing an example of the optical film of an embodiment of the present invention.

Furthermore, FIG. 1 is a schematic view, and the thicknesses relationship, the positional relationship, and the like among the respective layers are not necessarily consistent with actual ones, and any of the support shown in FIG. 1 and an alignment film are optional constitutional members.

An optical film 10 shown in FIG. 1 has a support 16, an alignment film 14, and an optically anisotropic layer 12 as the cured product in this order.

In addition, the optically anisotropic layer 12 may be a laminate of two or more different optically anisotropic layers. For example, in a case where the polarizing plate of an embodiment of the present invention which will be described later is used as a circularly polarizing plate or in a case where the optical film of an embodiment of the present invention is used as an optical compensation film for an IPS mode or an FFS mode liquid crystal display device, the optically anisotropic layer 12 is preferably a laminate of a positive A plate and a positive C plate.

In addition, the optically anisotropic layer may be peeled from the support, and the optically anisotropic layer may be used alone as an optical film.

Hereinafter, various members used for the optical film of the embodiment of the present invention will be described in detail.

[Optically Anisotropic Layer]

An optically anisotropic layer included in the optical film of the embodiment of the present invention is the above-mentioned optically anisotropic layer of the embodiment of the present invention.

In the optical film of the embodiment of the present invention, a thickness of the optically anisotropic layer is not particularly limited, but is preferably 0.1 to 10 µm, and more preferably 0.5 to 5 µm.

[Support]

The optical film of the embodiment of the present invention may have a support as a base material for forming an optically anisotropic layer as mentioned above.

Such a support is preferably transparent, and specifically, it preferably has a light transmittance of 80% or more.

Examples of such a support include a glass substrate and a polymer film, and examples of the material for the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an aspect in which a polarizer which will be described later may also function as such a support is also available.

In the present invention, a thickness of the support is not particularly limited, but is preferably 5 to 60 µm, and more preferably 5 to 40 µm.

[Alignment Film]

In a case where the optical film of the embodiment of the present invention has any of the above-mentioned supports, it is preferable that the optical film has an alignment film between the support and the optically anisotropic layer. Furthermore, an aspect in which the above-mentioned support may also function as an alignment film is also available.

The alignment film generally has a polymer as a main component. The materials for the polymer material for an alignment film are described in many documents, and many commercially available products can be used.

The polymer material used in the present invention is preferably a polyvinyl alcohol or a polyimide, or a derivative thereof. Particularly, a modified or non-modified polyvinyl alcohol is preferable.

Examples of the alignment film that can be used in the present invention include the alignment films described for Line 24 on Page 43 to Line 8 on Page 49 of WO01/88574A; the modified polyvinyl alcohols described in paragraphs [0071] to [0095] of JP3907735B; and the liquid crystal alignment film formed by a liquid crystal alignment agent described in JP2012-155308A.

In the present invention, for a reason that it is possible to prevent deterioration in the surface condition by avoiding a contact with the surface of an alignment film upon formation of the alignment film, a photo-alignment film is also preferably used as the alignment film.

The photo-alignment film is not particularly limited, but the polymer materials such as a polyamide compound and a polyimide compound, described in paragraphs [0024] to [0043] of WO2005/096041A; the liquid crystal alignment film formed by a liquid crystal alignment agent having a photo-alignment group, described in JP2012-155308A; LPP-JP265CP, trade name, manufactured by Rolic Technologies Ltd.; or the like can be used.

In addition, in the present invention, the thickness of the alignment film is not particularly limited, but from the viewpoint of forming an optically anisotropic layer having a uniform film thickness by mitigating the surface roughness that can be present on the support, the thickness is preferably 0.01 to 10 µm, more preferably 0.01 to 1 µm, and still more preferably 0.01 to 0.5 µm.

[Ultraviolet Absorber]

The optical film of the embodiment of the present invention preferably includes an ultraviolet (UV) absorber, taking an effect of external light (particularly ultraviolet rays) into consideration.

The ultraviolet absorber may be contained in the optically anisotropic layer of the embodiment of the present invention or may also be contained in a member other than an optically anisotropic layer constituting the optical film of the embodiment of the present invention. Suitable examples of the member other than the optically anisotropic layer include a support.

As the ultraviolet absorber, any one of ultraviolet absorbers known in the related art, which can express ultraviolet absorptivity, can be used. Among such the ultraviolet absorbers, a benzotriazole-based or hydroxyphenyltriazine-based ultraviolet absorber is preferably used from the viewpoint that it has high ultraviolet absorptivity and ultraviolet absorbing ability (ultraviolet-shielding ability) used for an image display device is obtained.

In addition, in order to broaden ultraviolet absorbing ranges, two or more kinds of ultraviolet absorbers having different maximum absorption wavelengths can be used in combination.

Specific examples of the ultraviolet absorber include the compounds described in paragraphs [0258] and [0259] of JP2012-18395A and the compounds described in paragraphs [0055] to [0105] of JP2007-72163A.

In addition, as a commercially available product thereof, for example, Tinuvin 400, Tinuvin 405, Tinuvin 460, Tinuvin 477, Tinuvin 479, and Tinuvin 1577 (all manufactured by BASF), or the like can be used.

[Polarizing Plate]

A polarizing plate of an embodiment of the present invention has the above-mentioned optical film of the embodiment of the present invention and a polarizer.

Furthermore, in a case where the above-mentioned optically anisotropic layer of the embodiment of the present invention is a λ/4 plate (positive A plate), the polarizing plate of the embodiment of the present invention can be used as a circularly polarizing plate.

In a case where the polarizing plate of the embodiment of the present invention is used as a circularly polarizing plate, the above-mentioned optically anisotropic layer of the embodiment of the present invention is used as a λ/4 plate (positive A plate), and an angle formed by the slow axis of the λ/4 plate and the absorption axis of a polarizer which will be described later is preferably 30° to 60°, more preferably 40° to 50°, still more preferably 42° to 48°, and particularly preferably 45°.

In addition, the polarizing plate of the embodiment of the present invention can also be used as an optical compensation film for an IPS mode or FFS mode liquid crystal display device.

In a case where the polarizing plate of the embodiment of the present invention is used as an optical compensation film for an IPS mode or FFS mode liquid crystal display device, it is preferable that the above-mentioned optically anisotropic layer of the embodiment of the present invention is used as at least one plate of a laminate of a positive A plate and a positive C plate, an angle formed by the slow axis of the positive A plate layer and the absorption axis of a polarizer which will be described later are orthogonal or parallel, and specifically, it is more preferable that an angle formed by the slow axis of the positive A plate layer and the absorption axis of the polarizer which will be described later is 0° to 5° or 85° to 95°.

Here, the "slow axis" of the λ/4 plate or the positive A plate layer means a direction in which a refractive index in the plane of the λ/4 plate or the positive A plate layer is maximum, and the "absorption axis" of the polarizer means a direction in which the absorbance is highest.

[Polarizer]

A polarizer contained in a polarizing plate of an embodiment of the present invention is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. The iodine-based polarizer and the dye-based polarizer are classified into a coating type polarizer and a stretching type polarizer, any of which can be applied, but a polarizer which is manufactured by allowing polyvinyl alcohol to adsorb iodine or a dichroic dye and performing stretching is preferable.

In addition, examples of a method of obtaining a polarizer by carrying out stretching and dyeing in a state of a laminated film in which a polyvinyl alcohol layer is formed on a base material include the methods disclosed in JP5048120B, JP5143918B, JP4691205B, JP4751481B, and JP4751486B, and known technologies relating to these polarizers can also be preferably used.

A polarizer in which thin films having different birefringence are laminated, a wire grid-type polarizer, a polarizer having a combination of a cholesteric liquid crystal having a selective reflection range, and a ¼ wavelength plate, or the like is used as the reflective type polarizer.

Among those, a polarizer including a polyvinyl alcohol-based resin (a polymer including —$CH_2$—CHOH— as a repeating unit, in particular, at least one selected from the group consisting of a polyvinyl alcohol and an ethylene-vinyl alcohol copolymer) is preferable from the viewpoint that it has more excellent adhesiveness.

In the present invention, the thickness of the polarizer is not particularly limited, but is preferably 3 μm to 60 μm, more preferably 3 μm to 30 μm, and still more preferably 3 μm to 10 μm.

[Pressure Sensitive Adhesive Layer]

The polarizing plate of the embodiment of the present invention may have a pressure sensitive adhesive layer arranged between the optically anisotropic layer in the optical film of the embodiment of the present invention and the polarizer.

The pressure sensitive adhesive layer used for lamination of the cured product and the polarizer represents, for example, a substance in which a ratio (tan δ=G"/G') between a storage elastic modulus G' and a loss elastic modulus G", each measured with a dynamic viscoelastometer, is 0.001 to 1.5, and examples thereof include a so-called pressure sensitive adhesive or a readily creepable substance. Examples of the pressure sensitive adhesive that can be used in the present invention include a polyvinyl alcohol-based pressure sensitive adhesive, but the pressure sensitive adhesive is not limited thereto.

[Adhesive Layer]

The polarizing plate of the embodiment of the present invention may have an adhesive layer arranged between the optically anisotropic layer in the optical film of the embodiment of the present invention and the polarizer.

As the adhesive layer used for laminating a cured product and a polarizer, a curable adhesive composition that is cured by irradiation with active energy rays or heating is preferable.

Examples of the curable adhesive composition include a curable adhesive composition containing a cationically polymerizable compound and a curable adhesive composition containing a radically polymerizable compound.

A thickness of the adhesive layer is preferably 0.01 to 20 μm, more preferably 0.01 to 10 μm, and still more preferably 0.05 to 5 μm. In a case where the thickness of the adhesive layer is within this range, floating or peeling does not occur between the protective layer or optically anisotropic layer and the polarizer, which are laminated, and a practically acceptable adhesive force can be obtained.

[Image Display Device]

An image display device of an embodiment of the present invention is an image display device having the optical film of the embodiment of the present invention or the polarizing plate of the embodiment of the present invention.

A display element used in the image display device of the embodiment of the present invention is not particularly limited, and examples thereof include a liquid crystal cell, an organic electroluminescent (hereinafter simply referred to as "EL") display panel, and a plasma display panel.

Among those, the liquid crystal cell and the organic EL display panel are preferable, and the liquid crystal cell is more preferable. That is, as the image display device of the embodiment of the present invention, a liquid crystal display device using a liquid crystal cell as a display element or an organic EL display device using an organic EL display panel as a display element is preferable, and the liquid crystal display device is more preferable.

[Liquid Crystal Display Device]

A liquid crystal display device which is an example of the image display device of the embodiment of the present invention is a liquid crystal display device having the above-mentioned polarizing plate of the embodiment of the present invention and a liquid crystal cell.

In addition, in the present invention, it is preferable that the polarizing plate of the embodiment of the present invention is used as the polarizing plate of the front side, and it is more preferable that the polarizing plate of the embodiment of the present invention is used as the polarizing plates on the front and rear sides, among the polarizing plates provided on the both sides of the liquid crystal cell.

Hereinafter, the liquid crystal cell constituting the liquid crystal display device will be described in detail.

<Liquid Crystal Cell>

The liquid crystal cell used for the liquid crystal display device is preferably in a vertical alignment (VA) mode, an optically compensated bend (OCB) mode, an in-plane-switching (IPS) mode, a fringe-field-switching (FFS) mode, or a twisted nematic (TN) mode, but is not limited thereto.

In a TN-mode liquid crystal cell, rod-shaped liquid crystal molecules are substantially horizontally aligned and are twist-aligned at 60° to 120° during no voltage application thereto. A TN-mode liquid crystal cell is most often used in a color TFT liquid crystal display device and described in numerous documents.

In a VA-mode liquid crystal cell, rod-shaped liquid crystal molecules are substantially vertically aligned during no voltage application thereto. Examples of the VA-mode liquid crystal cell include (1) a VA-mode liquid crystal cell in the narrow sense of the word, in which rod-shaped liquid crystal molecules are substantially vertically aligned during no voltage application thereto, but are substantially horizontally aligned during voltage application thereto (described in JP1990-176625A (JP-H02-176625A)), (2) an MVA-mode liquid crystal cell in which the VA-mode is multi-domained for viewing angle enlargement (described in SID97, Digest of Tech. Papers (preprint), 28 (1997) 845), (3) a liquid crystal cell in a mode (n-ASM mode) in which rod-shaped liquid crystal molecules are substantially vertically aligned during no voltage application thereto and are twistedly multi-domain aligned during voltage application thereto (described in Seminar of Liquid Crystals of Japan, Papers (preprint), 58-59 (1998)), and (4) a survival-mode liquid crystal cell (announced in LCD International 98). In addition, the liquid crystal cell may be of any of a patterned vertical alignment (PVA) type, an optical alignment type, and a polymer-sustained alignment (PSA) type. Details of these modes are specifically described in JP2006-215326A and JP2008-538819A.

In an IPS-mode liquid crystal cell, rod-shaped liquid crystal molecules are aligned substantially parallel with respect to a substrate, and application of an electric field parallel to the substrate surface causes the liquid crystal molecules to respond planarly. The IPS-mode displays black in a state where no electric field is applied and a pair of upper and lower polarizing plates have absorption axes which are orthogonal to each other. A method of improving the viewing angle by reducing light leakage during black display in an oblique direction using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display device which is an example of the image display device of the embodiment of the present invention include an aspect which includes, from the visible side, a polarizer, a λ/4 plate (a positive A plate) including the optically anisotropic layer of the embodiment of the present invention, and an organic EL display panel in this order.

Furthermore, the organic EL display panel is a display panel composed of an organic EL device in which an organic light emitting layer (organic electroluminescent layer) is sandwiched between electrodes (between a cathode and an anode). The configuration of the organic EL display panel is not particularly limited but a known configuration is adopted.

EXAMPLES

Hereinafter, the present invention will be described in more detail with reference to Examples. The materials, the amounts of materials used, the proportions, the treatment details, the treatment procedure, and the like shown in Examples below can be appropriately modified as long as the modifications do not depart from the spirit of the present invention. Therefore, the scope of the present invention should not be construed as being limited to Examples shown below.

Example 1

[Manufacture of Protective Film 1]

<Preparation of Core Layer Cellulose Acylate Dope 1>

The following composition was put into a mixing tank and stirred to dissolve the respective components to prepare a core layer cellulose acylate dope 1.

| Core layer cellulose acylate dope 1 | |
|---|---|
| Cellulose acetate having a degree of acetyl substitution of 2.88 | 100 parts by mass |
| Ester oligomer (the following compound 1-1) | 10 parts by mass |
| Durability improver (the following compound 1-2) | 4 parts by mass |
| Ultraviolet absorber (the following compound 1-3) | 3 parts by mass |
| Methylene chloride (first solvent) | 438 parts by mass |
| Methanol (second solvent) | 65 parts by mass |

-continued

Core layer cellulose acylate dope 1

Compound 1-1

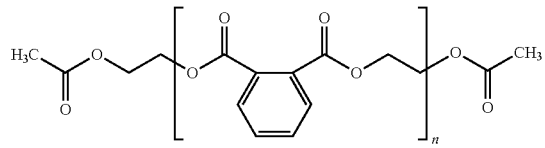

Compound 1-2

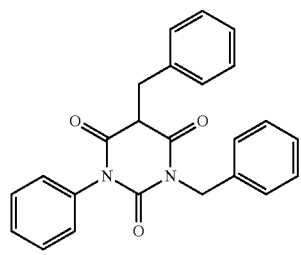 [SMILES: O=C1C(Cc2ccccc2)C(=O)N(c2ccccc2)C(=O)N1Cc1ccccc1]

Compound 1-3

-continued

Core layer cellulose acylate dope 1

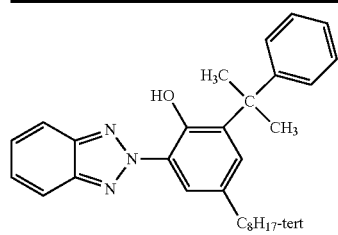

<Preparation of Outer Layer Cellulose Acylate Dope 1>

10 parts by mass of the following matting agent dispersion liquid 1 was added to 90 parts by mass of the core layer cellulose acylate dope 1 to prepare an outer layer cellulose acylate dope 1.

| Matting agent solution | |
|---|---|
| Silica particles with an average particle size of 20 nm (AEROSIL R972, manufactured by NIPPON AEROSIL CO., LTD.) | 2 parts by mass |
| Methylene chloride (first solvent) | 76 parts by mass |
| Methanol (second solvent) | 11 parts by mass |
| Core layer cellulose acylate dope 1 | 1 part by mass |

<Manufacture of Protective Film 1>

Three layers of the core layer cellulose acylate dope 1 and the outer layer cellulose acylate dopes 1 on both sides thereof were simultaneously casted from a casting port onto a drum at 20° C. In a state where a content of the solvent in the film on the drum was approximately 20% by mass, the film was peeled from the drum, and both ends of the obtained film in the width direction were fixed with tenter clips, and in a state where a content of the residual solvent in the film was 3% to 15% by mass, the film was stretched 1.2 times in the transverse direction and dried. Thereafter, the obtained film was transported between the rolls of a heat treatment device to manufacture a cellulose acylate film 1 with a thickness of 25 µm, which was used as a protective film 1.

[Manufacture of Protective Film 1 with Hardcoat Layer]

As a coating liquid for forming a hardcoat layer, a curable composition (hardcoat layer 1) for a hardcoat layer shown in Table 4 below was prepared.

TABLE 4

| | Monomer | | | | UV initiator | | |
|---|---|---|---|---|---|---|---|
| | Monomer 1 | Monomer 2 | Monomer 1/ monomer 2 | Sum of addition amounts [parts by mass] | Type | Addition amount [parts by mass] | Solvent |
| Hardcoat layer 1 | Pentaerythritol triacrylate | Pentaerythritol tetraacrylate | 3/2 | 53.5 | UN initiator 1 | 1.5 | Ethyl acetate |

The structure of a UV initiator 1 in Table 4 above is shown below.

The curable composition 1 for hardcoat layer was applied onto a surface of the protective film 1 manufactured above, then dried at 100° C. for 60 seconds, irradiated with UV at 1.5 kW and 300 mJ under the conditions of 0.1% or less of nitrogen, and cured to manufacture a protective film 1 with a hardcoat layer, having a hardcoat layer with a film thickness of 5 µm. Furthermore, the film thickness of the hardcoat layer was adjusted by adjusting a coating amount by a die coating method, using a slot die.

[Manufacture of Polarizing Plate 1 with Protective Film on One Surface]

(1) Saponification of Film

The manufactured protective film 1 with a hardcoat layer was immersed for 1 minute in a 4.5 mol/L aqueous sodium hydroxide solution (saponified solution) whose temperature was adjusted to 37° C., and then the film was washed with water, then immersed in a 0.05 mol/L aqueous sulfuric acid solution for 30 seconds, and then further passed through a water washing bath. Then, the obtained film was repeatedly dehydrated three times with an air knife, water was dropped thereto, and then the film was dried by leaving it in a drying zone at 70° C. for 15 seconds to manufacture a protective film 1 with a hardcoat layer which had been saponified.

(2) Manufacture of Polarizer

According to Examples of JP2016-148724A, a polarizer with a film thickness of 15 μm was prepared by giving a circumferential speed difference between two pairs of nip rolls and performing stretching in the longitudinal direction. A polarizer thus manufactured was used as a polarizer 1.

(3) Bonding

The polarizer 1 thus obtained and the protective film 1 with a hardcoat layer which had been subjected to the saponification treatment were bonded in a roll-to-roll manner so that the polarizing axis and the longitudinal direction of the film are orthogonal to each other, using a 3% aqueous PVA solution (manufactured by Kuraray Co., Ltd., PVA-117H) as an adhesive, thereby forming a polarizing plate 1 with a protective film on one surface thereof (hereinafter also simply referred to as a "polarizing plate 1"). At this time, the bonding was performed so that the cellulose acylate film side of the protective film was on the polarizer side.

[Manufacture of Polarizing Plate 2 with Protective Film on One Surface]

In the same manner as in the manufacture of the polarizing plate 1, except that a hardcoat layer was not provided on a surface of the protective film 1, a polarizing plate 2 with a protective film on one surface (hereinafter also simply referred to as a "polarizing plate 2") was manufactured. Furthermore, in the following Examples and Comparative Examples, each liquid crystal display device was manufactured, using the polarizing plate 1 on a visual recognition side and the polarizing plate 2 on a backlight side unless otherwise specified.

[Manufacture of Protective Film 2]

<Manufacture of Core Layer Cellulose Acylate Dope 2>

The following composition was put into a mixing tank and stirred to dissolve the respective components to prepare a core layer cellulose acylate dope 2.

| Core layer cellulose acylate dope 2 | |
|---|---|
| Cellulose acetate having a degree of acetyl substitution of 2.88 | 100 parts by mass |
| The following polyester | 12 parts by mass |
| The durability improver (the compound 1-2) | 4 parts by mass |
| Methylene chloride (first solvent) | 430 parts by mass |
| Methanol (second solvent) | 64 parts by mass |

Polyester (Number-Average Molecular Weight of 800)

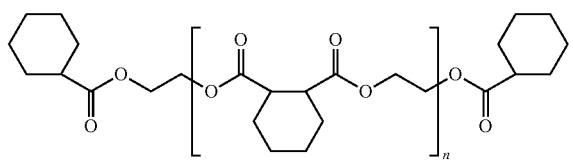

<Manufacture of Outer Layer Cellulose Acylate Dope 2>

10 parts by mass of the following matting agent solution was added to 90 parts by mass of the core layer cellulose acylate dope 2 to prepare an outer layer cellulose acylate dope 2.

| Matting agent solution | |
|---|---|
| Silica particles with an average particle size of 20 nm (AEROSIL R972, manufactured by NIPPON AEROSIL CO., LID.) | 2 parts by mass |
| Methylene chloride (first solvent) | 76 parts by mass |
| Methanol (second solvent) | 11 parts by mass |
| Core layer cellulose acylate dope | 1 part by mass |

<Manufacture of Protective Film 2>

The core layer cellulose acylate dope 2 and the outer layer cellulose acylate dope 2 were filtered through a filter paper having an average pore diameter of 34 μm and a sintered metal filter having an average pore diameter of 10 μm, and then all the three layers of the core layer cellulose acylate dope 2 and the outer layer cellulose acylate dopes 2 on both sides thereof were simultaneously cast on a drum at 20° C. from a casting port (band casting machine).

Subsequently, the film was peeled from the drum in a state where a content of the solvent of the film on the drum reached approximately 20% by mass, the both ends of the film in the width direction were fixed with tenter clips, and the film was dried while being stretched at a stretching ratio of 1.1 times in the transverse direction.

Thereafter, the obtained film was transported between the rolls of a heat treatment device and further dried to manufacture a cellulose acylate film 2 with a thickness of 40 μm, which was used as a protective film 2. As a result of the measurement of the phase difference of the protective film 2, Re=1 nm and Rth=−5 nm were obtained.

[Manufacture of First Optically Anisotropic Layer 1]

<Preparation of Composition 1 for Photo-Alignment Film>

8.4 parts by mass of the following copolymer C1 and 0.3 parts by mass of the following thermal acid generator D1 were added to butyl acetate/methyl ethyl ketone (80 parts by mass/20 parts by mass) to form a composition for a photo-alignment film.

Copolymer C1 (weight-average molecular weight: 40,000, the numerical value in the following formula indicates the content (% by mass) of each repeating unit)

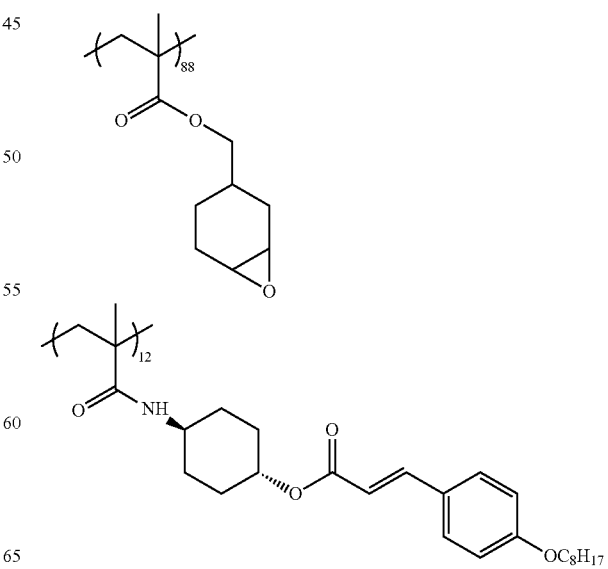

Thermal Acid Generator D1

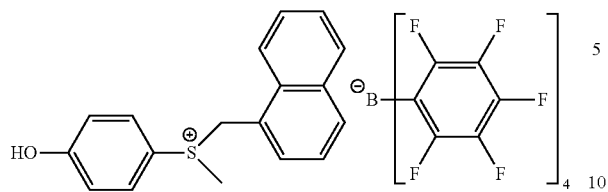

<Preparation of Composition 1 for Forming Optically Anisotropic Layer>

A composition 1 for forming an optically anisotropic layer having the following composition was prepared.

| Composition 1 for forming an optically anisotropic layer | |
|---|---|
| The following liquid crystal compound R1 | 42.00 parts by mass |
| The following liquid crystal compound R2 | 42.00 parts by mass |

| Composition 1 for forming an optically anisotropic layer | |
|---|---|
| The following polyfunctional compound T1 | 4.00 parts by mass |
| The following polymerizable compound A1 | 12.00 parts by mass |
| The following polymerization initiator S1 | 0.50 parts by mass |
| The following leveling agent P1 | 0.15 parts by mass |
| HISOLVE MTEM (manufactured by Toho Chemical Industry Co., Ltd.) | 2.00 parts by mass |
| NK ESTER A-200 (manufactured by Shin Nakamura Chemical Co., Ltd.) | 1.00 part by mass |
| Methyl ethyl ketone | 424.8 parts by mass |

Moreover, a group adjacent to the acryloyloxy group of the following reverse dispersion liquid crystal compound A1 represents a propylene group (a group obtained by substituting a methyl group with an ethylene group), and the following reverse dispersion liquid crystal compound A1 represents a mixture of regioisomers in which the positions of the methyl groups are different from each other.

Liquid Crystal Compound R1

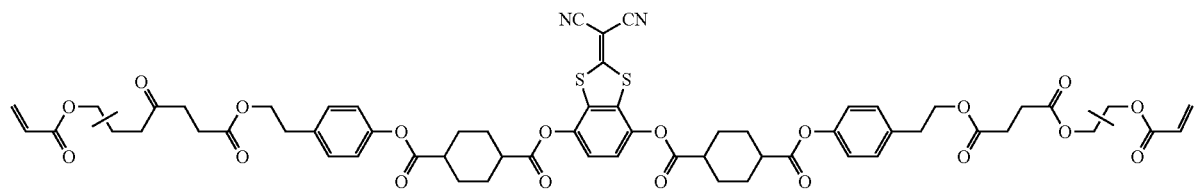

Liquid Crystal Compound R2

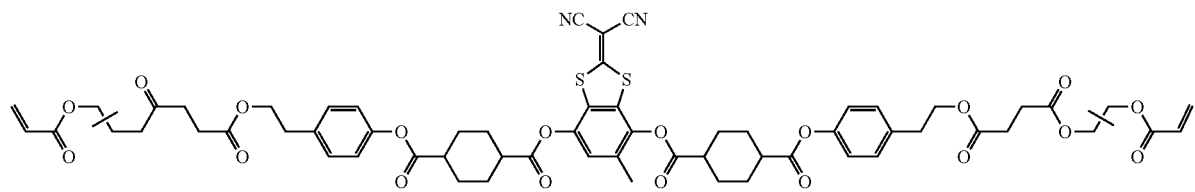

Polyfunctional Compound T1

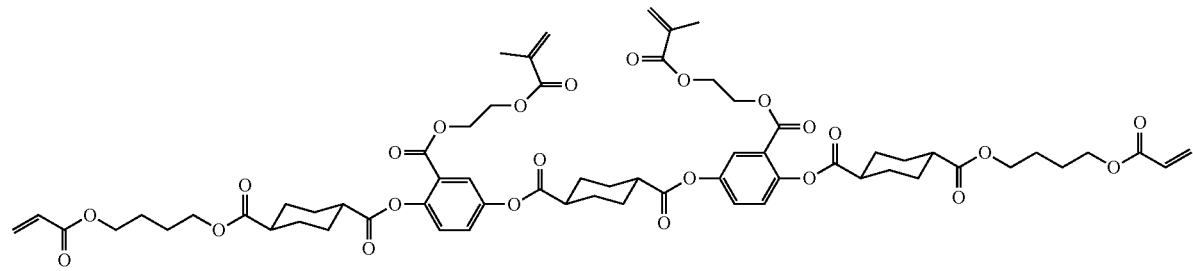 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOC(=O)C(=C)C)c4)CC3)cc2C(=O)OCCOC(=O)C(=C)C)CC1]

Polyfunctional Compound A1

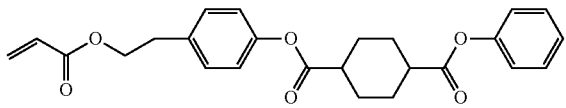 [SMILES: C=CC(=O)OCCc1ccc(OC(=O)C2CCC(C(=O)Oc3ccccc3)CC2)cc1]

Polymerization Initiator S1

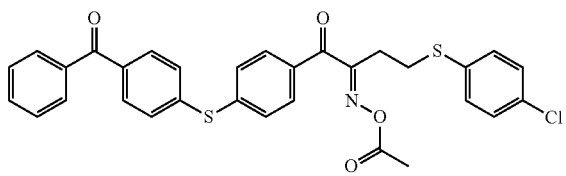 [SMILES: CC(=O)O/N=C(\CCSc1ccc(Cl)cc1)C(=O)c1ccc(Sc2ccc(C(=O)c3ccccc3)cc2)cc1]

Leveling agent P1 [in the following formulae, a to c satisfy a:b:c=66:26:8 and represent contents (% by mole) of the respective repeating unit with respect to all repeating units in the resin]

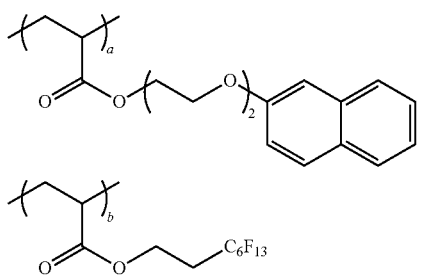

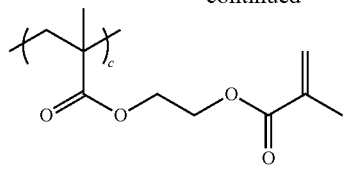

<Manufacture of First Optically Anisotropic Layer 1>

The composition 1 for the photo-alignment film prepared in advance was applied onto a surface on one side of the manufactured protective film 2 with a bar coater. After the application, the film was dried on a hot plate at 120° C. for 5 minute to remove the solvent, thereby forming a photoisomerization composition layer with a thickness of 0.2 μm. The obtained photoisomerization composition layer was irradiated with polarized ultraviolet rays (10 mJ/cm$^2$, using an ultra-high-pressure mercury lamp) to form a photo-alignment film 1.

Subsequently, the composition 1 for forming an optically anisotropic layer prepared in advance was applied onto the photo-alignment film 1 with a bar coater to form a composition layer. The formed composition layer was first heated in a hot plate to 110° C. and then cooled 60° C. to stabilize the alignment. Thereafter, the obtained film was kept at the temperature at 60° C., the alignment was immobilized by irradiation with ultraviolet rays (500 mJ/cm$^2$, using an ultra-high-pressure mercury lamp) in a nitrogen atmosphere (an oxygen concentration of 100 ppm), to form a first optically anisotropic layer 1 with a thickness of 2 μm. The in-plane retardation Re1(550) and Re1(450)/Re1(550) of the obtained first optically anisotropic layer 1 were 130 nm and 0.85, respectively, which indicates reverse wavelength dispersibility.

[Manufacture of Second Optically Anisotropic Layer 1]

<Preparation of Composition 2 for Forming Optically Anisotropic Layer>

A composition 2 for forming an optically anisotropic layer having the following composition was prepared.

| Composition 2 for forming an optically anisotropic layer | |
|---|---|
| The liquid crystal compound R1 | 10.0 parts by mass |
| The liquid crystal compound R2 | 47.0 parts by mass |
| The following liquid crystal compound R3 | 35.0 parts by mass |
| The polyfunctional compound T1 | 8.0 parts by mass |
| The following polymerizable compound B1 | 4.5 parts by mass |
| The following non-liquid crystal compound C1 | 5.0 parts by mass |
| Monomer K1 (A-600, manufactured by Shin Nakamura Chemical Co., Ltd.) | 10.0 part by mass |
| The polymerization initiator S1 | 1.5 parts by mass |
| The following surfactant P2 | 0.4 parts by mass |
| The following surfactant P3 | 0.5 parts by mass |
| Acetone | 175.0 parts by mass |
| Propylene glycol monomethyl ether acetate | 75.0 parts by mass |

Liquid crystal compound R3

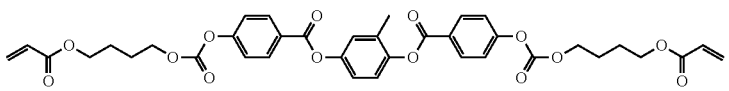 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Polymerizable Compound B1

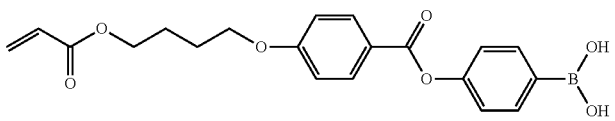 [SMILES: C=CC(=O)OCCCCOc1ccc(C(=O)Oc2ccc(B(O)O)cc2)cc1]

-continued

Composition 2 for forming an optically anisotropic layer

Non-liquid crystal compound C1

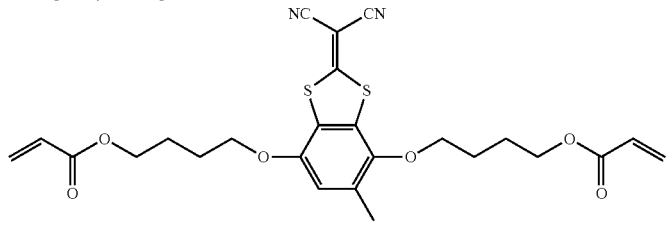 [SMILES: C=CC(=O)OCCCCOc1cc(C)c(OCCCCOC(=O)C=C)c2c1SC(=C(C#N)C#N)S2]

Surfactant P2 [weight-average molecular weight: 15,000, the numerical value in the following formula indicates the content (% by mass) of each repeating unit with respect to all repeating units]

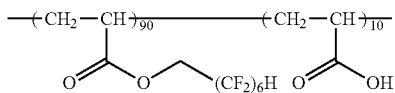

Surfactant P3 [weight-average molecular weight: 11,200, the numerical values in the following formulae each indicate a content (% by mass) of each repeating unit with respect to all repeating units]

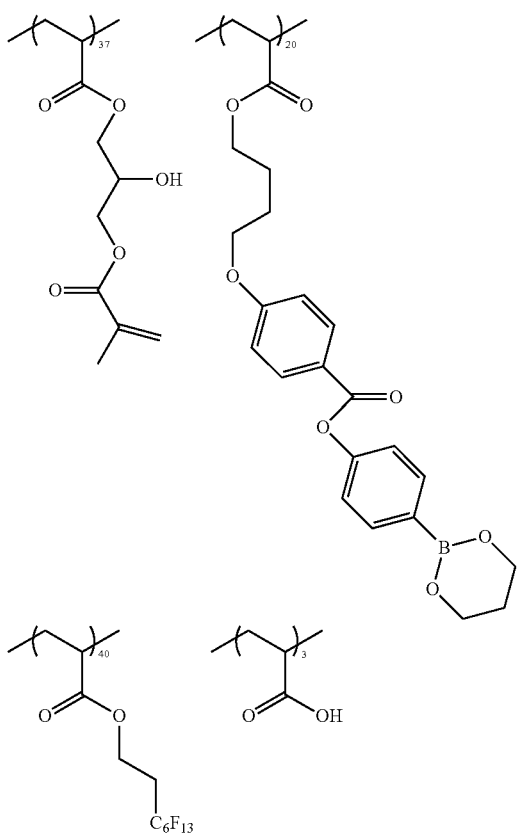

<Manufacture of Second Optically Anisotropic Layer 1>

The surface on the coated side of the first optically anisotropic layer 1 was subjected to a corona treatment at a discharge amount of 150 W·min/m², and the composition 2 for forming the optically anisotropic layer was applied onto the surface which had been subjected to the corona treatment, using a wire bar.

Subsequently, heating was performed with warm air at 70° C. for 90 seconds in order to dry the solvent of the composition and subject the liquid crystal compound to alignment-aging. Under a nitrogen purge, ultraviolet irradiation (300 mJ/cm²) was performed at an oxygen concentration of 0.1% at 40° C., and the alignment of the liquid crystal compound was immobilized to manufacture a second optically anisotropic layer 1 on the first optically anisotropic layer 1. The thickness-direction retardation Rth2(550) and the Rth2(450)/Rth2(550) of the obtained second optically anisotropic layer 1 were −100 nm and 0.95, respectively.

[Manufacture of First Polarizing Plate]

The surface on the second optically anisotropic layer 1 side of a laminate of the first optically anisotropic layer 1 and the second optically anisotropic layer 1, each manufactured above, was bonded to the polarizer surface of the manufactured polarizing plate 1 with a protective film on one surface, using an adhesive, so that the absorption axis of the polarizer and the slow axis of the optically anisotropic layer were in parallel directions. The protective film 2 of the first optically anisotropic layer 1 was peeled to manufacture a first polarizing plate of Example 1. As the adhesive, a 3% aqueous PVA solution (manufactured by Kuraray Co., Ltd., PVA-117H) was used. At this time, the polarizer and the optical compensation layer had sufficient adhesiveness for practical use.

[Manufacture of Protective Film 3]

<Preparation of Polymethyl Methacrylate (PMMA) Dope>

The following dope composition was put into a mixing tank and stirred to dissolve each component to prepare a PMMA dope.

| PMMA Dope | |
|---|---|
| PMMA resin | 100 parts by mass |
| Sumilizer GS (manufactured by Sumitomo Chemical Co., Ltd.) | 0.1 parts by mass |
| Dichloromethane | 426 parts by mass |
| Methanol | 64 parts by mass |

<Manufacture of Protective Film 3>

The manufactured PMMA dope was uniformly cast on a stainless steel-made band (casting support) from a casting die (band casting machine).

Subsequently, the film was peeled in a state where the solvent content in the cast film was approximately 20% by mass, and the both ends of the film in the width direction were fixed with tenter clips and dried while the film was stretched at a stretching ratio of 1.1 times in the transverse direction.

Thereafter, the obtained film was transported between the rolls of a heat treatment device and further dried to manufacture a PMMA film with a film thickness of 20 μm, which was used as a protective film 3.

[Manufacture of Second Polarizing Plate]

<Preparation of Adhesive Solution>

The following compounds were mixed in the ratio described to prepare an adhesive solution A.

Aronix M-220 (manufactured by Toagosei Co., Ltd.): 20 parts by mass
- 4-Hydroxybutyl acrylate (manufactured by Nihon Kasei Co., Ltd.): 40 parts by mass
- 2-Ethylhexyl acrylate (manufactured by Mitsubishi Chemical Corporation): 40 parts by mass
- Irgacure 907 (manufactured by BASF): 1.5 parts by mass
- KAYACURE DETX-S (manufactured by Nippon Kayaku Co., Ltd.): 0.5 parts by mass The polarizer-bonded surface of the protective film 3 was corona-treated with a discharge amount of 150 W·min/m$^2$, and then the adhesive solution A was coated so that the film thickness was 0.5 μm. Then, the adhesive-coated surface was bonded to the polarizer surface of the polarizing plate 2 with a protective film on one surface, and irradiated with ultraviolet rays from the base material side of the protective film 3 at 300 mJ/cm$^2$ at 40° C. in an air atmosphere. Thereafter, the resultant was dried at 60° C. for 3 minutes to manufacture a second polarizing plate of Example 1.

[Manufacture of Liquid Crystal Display Device]

Polarizing plates on the front and back surfaces from a commercially available liquid crystal display device (iPad (registered trademark), manufactured by Apple Inc.) (liquid crystal display device including a liquid crystal cell in an FFS mode) were peeled, and thus, the first polarizing plate including the first optically anisotropic layer 1 and the second optically anisotropic layer 1 manufactured above was bonded on the visible side and the second polarizing plate was bonded on a backlight side with a 20 μm acrylic pressure sensitive adhesive so that the alignment direction of the liquid crystal in the liquid crystal cell was orthogonal to the absorption axis of the polarizer in the first polarizing plate, thereby manufacturing a liquid crystal display device of Example 1.

Furthermore, the liquid crystal cell in the liquid crystal display device includes a color filter layer on the substrate on the first polarizing plate side and the TFT layer on the substrate on the second polarizing plate side, and the Rth (550) of both the layers were 10 nm and 2 nm, respectively. In addition, Δn·d of the liquid crystal compound in the liquid crystal cell was 340, and the tilt angle of the liquid crystal compound with respect to the substrate surface was 0.1°.

Examples 2 to 117 and Comparative Examples 1 to 13

A liquid crystal display device was manufactured by the same method as in Example 1, except that the liquid crystal compound and the non-liquid crystal compound were changed to the compounds shown in Tables 5 to 9 below in the composition 2 for forming an optically anisotropic layer used for forming the second optically anisotropic layer.

[Evaluation]

<Front Contrast (Front CR)>

First, a liquid crystal display device for an evaluation standard was manufactured by the same method as in Example 1, except that the first polarizing plate and the second polarizing plate were changed to a polarizing plate 0 in which a positive A plate and a positive C plate were not bonded to each other.

For the liquid crystal display devices manufactured for Examples and Comparative Examples and for evaluation standards, a luminance (Yw) in the direction vertical to a panel in a white display and a luminance (Yb) in the direction vertical to a panel in a black display were measured using a commercially available measuring apparatus for a liquid crystal viewing angle and chromaticity characteristics, Ezcontrast (manufactured by ELDIM), and a contrast ratio (Yw/Yb) in the direction vertical to the panel was calculated and taken as a front contrast, and evaluated according to the following standard. The results are shown in Tables 5 to 9 below.

A: The front contrast is 90% or more for a liquid crystal display device for an evaluation standard B: The front contrast is 80% or more and less than 90% for a liquid crystal display device for an evaluation standard C: The front contrast is 70% or more and less than 80% for a liquid crystal display device for an evaluation standard D: The front contrast is less than 70% for a liquid crystal display device for an evaluation standard <Light Resistance>

A laminate of the first optically anisotropic layer and the second optically anisotropic layer, each manufactured above, was exposed to light for 100 hours, using a super xenon weather meter SX75.

At this time, a protective film 1 was sandwiched between the laminate and the super xenon weather meter SX75, and the light was arranged so as to enter from the second optically anisotropic layer.

By comparing the exposed sample with a similar unexposed sample, a change in the tint of the film and a change in the thickness-direction retardation (Rth) of the second optically anisotropic layer were evaluated. The results are shown in Tables 5 to 9 below.

(Color Change)

A: Δb*≤2.0 for samples not exposed to the xenon weather meter

B: 2.0<Δb*≤4.0 for samples not exposed to the xenon weather meter

C: 4.0<Δb* for samples not exposed to the xenon weather meter (Phase Difference Change)

A: ΔRth≤5 nm for samples not exposed to the xenon weather meter

B: 5 nm<ΔRth≤10 nm for samples not exposed to the xenon weather meter

C: 10 nm<ΔRth for samples not exposed to the xenon weather meter

TABLE 5

| | Liquid crystal compound Type Value in parenthesis: molar ratio (% by mass) | Non-liquid crystal compound Ar | Non-liquid crystal compound K | Non-liquid crystal compound Mw | Comparison of Ar cores | Ratio of molecular weight (molecular weight N/ molecular weight L) | Light resistance Front CR | Light resistance Tint change | Light resistance Phase difference change |
|---|---|---|---|---|---|---|---|---|---|
| Example 1 | R1/R2/R3 (11/51/38) | Ar-13 | K-7 | 514.6 | Same | 0.42 | A | A | A |
| Example 2 | R1/R2/R3 (11/51/38) | Ar-13 | K-53 | 658.7 | same | 0.53 | A | A | A |
| Example 3 | R1/R2/R3 (11/51/38) | Ar-13 | K-1 | 458.5 | Same | 0.37 | A | A | A |
| Example 4 | R1/R2/R3 (11/51/38) | Ar-12 | K-1 | 444.5 | Same | 0.36 | A | A | A |
| Example 5 | R1/R2/R3 (11/51/38) | Ar-13 | K-51 | 754.7 | Same | 0.61 | A | B | B |
| Example 6 | R1/R2/R3 (11/51/38) | Ar-13 | K-58 | 935.2 | Same | 0.76 | B | A | A |
| Example 7 | R4/R5/R15 (20/40/40) | Ar-12 | K-1 | 444.5 | Same | 0.46 | A | A | A |
| Example 8 | R4/R5/R15 (20/40/40) | Ar-14 | K-7 | 556.7 | Same | 0.54 | A | A | A |
| Example 9 | R6 | Ar-4 | K-7 | 563.7 | Same | 0.51 | A | A | A |
| Example 10 | R7 | Ar-22 | K-7 | 580.7 | Same | 0.51 | A | A | A |
| Example 11 | R6 | Ar-4 | K-11 | 619.8 | Same | 0.56 | A | A | A |
| Example 12 | R7 | Ar-22 | K-11 | 636.8 | Same | 0.56 | A | A | A |
| Example 13 | R8 | Ar-7 | K-2 | 557.6 | Same | 0.61 | A | A | A |
| Example 14 | R9 | Ar-9 | K-2 | 641.8 | Same | 0.55 | A | A | A |
| Example 15 | R10 | Ar-10 | K-7 | 957.3 | Same | 0.64 | A | A | A |
| Example 16 | R11 | Ar-11 | K-7 | 993.2 | Same | 0.64 | A | A | A |
| Example 17 | R12 | Ar-3 | K-7 | 540.6 | Same | 0.47 | A | A | A |
| Example 18 | R13 | Ar-4 | K-7 | 563.7 | Same | 0.52 | A | A | A |
| Example 19 | R14 | Ar-21 | K-2 | 481.5 | Same | 0.58 | A | A | A |
| Example 20 | R10 | Ar-10 | K-23 | 989.3 | Same | 0.66 | A | A | A |
| Example 21 | R11 | Ar-11 | K-23 | 1025.2 | Same | 0.66 | A | A | A |
| Example 22 | R12 | Ar-3 | K-23 | 572.6 | Same | 0.50 | A | A | A |
| Example 23 | R13 | Ar-4 | K-23 | 595.7 | Same | 0.55 | A | A | A |
| Example 24 | R14 | Ar-21 | K-7 | 537.6 | Same | 0.64 | A | A | A |
| Example 25 | R1/R2/R3 (11/51/38) | Ar-14 | K-7 | 556.7 | Similar | 0.45 | A | B | B |
| Example 26 | R1/R2/R3 (11/51/38) | Ar-4 | K-7 | 563.7 | Similar | 0.46 | A | B | B |
| Example 27 | R1/R2/R3 (11/51/38) | Ar-22 | K-7 | 580.7 | Similar | 0.47 | A | B | B |
| Example 28 | R1/R2/R3 (11/51/38) | Ar-7 | K-2 | 557.6 | Similar | 0.45 | A | B | B |
| Example 29 | R1/R2/R3 (11/51/38) | Ar-9 | K-2 | 641.8 | Similar | 0.52 | A | B | B |
| Example 30 | R1/R2/R3 (11/51/38) | Ar-10 | K-7 | 957.3 | Similar | 0.77 | B | B | B |

TABLE 6

| | Liquid crystal compound Type Value in parenthesis: molar ratio (wt %) | Non-liquid crystal compound Ar | Non-liquid crystal compound K | Non-liquid crystal compound Mw | Comparison of Ar cores | Ratio of molecular weight (molecular weight N/ molecular weight L) | Light resistance Front CR | Light resistance Tint change | Light resistance Phase difference change |
|---|---|---|---|---|---|---|---|---|---|
| Example 31 | R1/R2/R3 (11/51/38) | Ar-11 | K-7 | 993.2 | Similar | 0.80 | B | B | B |
| Example 32 | R1/R2/R3 (11/51/38) | Ar-3 | K-7 | 540.6 | Similar | 0.44 | A | B | B |
| Example 33 | R1/R2/R3 (11/51/38) | Ar-21 | K-7 | 537.6 | Similar | 0.44 | A | B | B |
| Example 34 | R4/R5/R15 (20/40/40) | Ar-13 | K-7 | 514.6 | Similar | 0.53 | A | B | B |
| Example 35 | R4/R5/R15 (20/40/40) | Ar-4 | K-7 | 553.7 | Similar | 0.58 | A | B | B |
| Example 36 | R4/R5/R15 (20/40/40) | Ar-22 | K-7 | 580.7 | Similar | 0.60 | A | B | B |
| Example 37 | R4/R5/R15 (20/40/40) | Ar-7 | K-2 | 557.6 | Similar | 0.57 | A | B | B |
| Example 38 | R4/R5/R15 (20/40/40) | Ar-9 | K-2 | 641.8 | Similar | 0.66 | A | B | B |
| Example 39 | R4/R5/R15 (20/40/40) | Ar-10 | K-2 | 901.2 | Similar | 0.93 | B | B | B |
| Example 40 | R4/R5/R15 (20/40/40) | Ar-3 | K-7 | 540.6 | Similar | 0.56 | A | B | B |
| Example 41 | R4/R5/R15 (20/40/40) | Ar-21 | K-7 | 537.6 | Similar | 0.55 | A | B | B |
| Example 42 | R6 | Ar-13 | K-7 | 514.6 | Similar | 0.46 | A | B | B |
| Example 43 | R6 | Ar-14 | K-7 | 556.7 | Similar | 0.50 | A | B | B |
| Example 44 | R6 | Ar-22 | K-7 | 580.7 | Similar | 0.52 | A | B | B |
| Example 45 | R6 | Ar-7 | K-2 | 557.6 | Similar | 0.50 | A | B | B |
| Example 46 | R6 | Ar-9 | K-2 | 641.8 | Similar | 0.58 | A | B | B |
| Example 47 | R6 | Ar-10 | K-7 | 957.3 | Similar | 0.86 | B | B | B |
| Example 48 | R6 | Ar-11 | K-7 | 993.2 | Similar | 0.89 | B | B | B |
| Example 49 | R6 | Ar-3 | K-7 | 540.6 | Similar | 0.49 | A | B | B |
| Example 50 | R6 | Ar-21 | K-2 | 481.5 | Similar | 0.43 | A | B | B |
| Example 51 | R7 | Ar-4 | K-7 | 563.7 | Similar | 0.50 | A | B | B |
| Example 52 | R7 | Ar-13 | K-7 | 514.6 | Similar | 0.46 | A | B | B |
| Example 53 | R7 | Ar-14 | K-7 | 556.7 | Similar | 0.49 | A | B | B |

TABLE 6-continued

| | Liquid crystal compound Type Value in parenthesis: molar ratio (wt %) | Non-liquid crystal compound Ar | K | Mw | Comparison of Ar cores | Ratio of molecular weight (molecular weight N/ molecular weight L) | Light resistance Front CR | Tint change | Phase difference change |
|---|---|---|---|---|---|---|---|---|---|
| Example 54 | R7 | Ar-7 | K-2 | 557.6 | Similar | 0.49 | A | B | B |
| Example 55 | R7 | Ar-9 | K-2 | 641.8 | Similar | 0.57 | A | B | B |
| Example 56 | R7 | Ar-10 | K-7 | 957.3 | Similar | 0.85 | B | B | B |
| Example 57 | R7 | Ar-11 | K-7 | 993.2 | Similar | 0.88 | B | B | B |
| Example 58 | R7 | Ar-3 | K-7 | 540.6 | Similar | 0.48 | A | B | B |
| Example 59 | R7 | Ar-21 | K-2 | 481.5 | Similar | 0.43 | A | B | B |
| Example 60 | R8 | Ar-13 | K-7 | 514.6 | Similar | 0.57 | A | B | B |

TABLE 7

| | Liquid crystal compound Ratio (wt %) | Non-liquid crystal compound Ar | K | Mw | Comparison of Ar cores | Ratio of molecular weight (molecular weight N/ molecular weight L) | Light resistance Front CR | Tint change | Phase difference change |
|---|---|---|---|---|---|---|---|---|---|
| Example 61 | R8 | Ar-14 | K-7 | 556.7 | Similar | 0.61 | A | B | B |
| Example 62 | R8 | Ar-4 | K-7 | 563.7 | Similar | 0.62 | A | B | B |
| Example 63 | R8 | Ar-22 | K-7 | 580.7 | Similar | 0.64 | A | B | B |
| Example 64 | R8 | Ar-9 | K-7 | 697.9 | Similar | 0.77 | B | B | B |
| Example 65 | R8 | Ar-3 | K-7 | 540.6 | Similar | 0.59 | A | B | B |
| Example 66 | R8 | Ar-21 | K-2 | 481.5 | Similar | 0.53 | A | B | B |
| Example 67 | R9 | Ar-13 | K-7 | 514.6 | Similar | 0.44 | A | B | B |
| Example 68 | R9 | Ar-14 | K-7 | 556.7 | Similar | 0.48 | A | B | B |
| Example 69 | R9 | Ar-4 | K-7 | 563.7 | Similar | 0.48 | A | B | B |
| Example 70 | R9 | Ar-22 | K-7 | 580.7 | Similar | 0.50 | A | B | B |
| Example 71 | R9 | Ar-10 | K-7 | 957.3 | Similar | 0.82 | B | B | B |
| Example 72 | R9 | Ar-11 | K-7 | 993.2 | Similar | 0.85 | B | B | B |
| Example 73 | R9 | Ar-3 | K-7 | 540.6 | Similar | 0.46 | A | B | B |
| Example 74 | R9 | Ar-21 | K-2 | 481.5 | Similar | 0.41 | A | B | B |
| Example 75 | R10 | Ar-13 | K-7 | 514.6 | Similar | 0.34 | A | B | B |
| Example 76 | R10 | Ar-14 | K-7 | 556.7 | Similar | 0.37 | A | B | B |
| Example 77 | R10 | Ar-4 | K-7 | 563.7 | Similar | 0.37 | A | B | B |
| Example 78 | R10 | Ar-22 | K-7 | 580.7 | Similar | 0.39 | A | B | B |
| Example 79 | R10 | Ar-7 | K-2 | 557.6 | Similar | 0.37 | A | B | B |
| Example 80 | R10 | Ar-9 | K-2 | 641.8 | Similar | 0.43 | A | B | B |
| Example 81 | R10 | Ar-11 | K-7 | 993.2 | Similar | 0.66 | A | B | B |
| Example 82 | R10 | Ar-3 | K-7 | 540.6 | Similar | 0.36 | A | B | B |
| Example 83 | R10 | Ar-21 | K-2 | 481.5 | Similar | 0.32 | A | B | B |
| Example 84 | R11 | Ar-13 | K-7 | 514.6 | Similar | 0.33 | A | B | B |
| Example 85 | R11 | Ar-14 | K-7 | 556.7 | Similar | 0.36 | A | B | B |
| Example 86 | R11 | Ar-4 | K-7 | 563.7 | Similar | 0.37 | A | B | B |
| Example 87 | R11 | Ar-22 | K-7 | 580.7 | Similar | 0.38 | A | B | B |
| Example 88 | R11 | Ar-7 | K-2 | 557.6 | Similar | 0.36 | A | B | B |
| Example 89 | R11 | Ar-9 | K-2 | 641.8 | Similar | 0.42 | A | B | B |
| Example 90 | R11 | Ar-10 | K-7 | 957.3 | Similar | 0.62 | A | B | B |

TABLE 8

| | Liquid crystal compound Ratio (wt %) | Non-liquid crystal compound Ar | Non-liquid crystal compound K | Non-liquid crystal compound Mw | Comparison of Ar cores | Ratio of molecular weight (molecular weight N/ molecular weight L) | Light resistance Front CR | Light resistance Tint change | Light resistance Phase difference change |
|---|---|---|---|---|---|---|---|---|---|
| Example 91 | R11 | Ar-3 | K-7 | 540.6 | Similar | 0.35 | A | B | B |
| Example 92 | R11 | Ar-21 | K-2 | 481.5 | Similar | 0.31 | A | B | B |
| Example 93 | R12 | Ar-13 | K-7 | 514.6 | Similar | 0.45 | A | B | B |
| Example 94 | R12 | Ar-14 | K-7 | 556.7 | Similar | 0.48 | A | B | B |
| Example 95 | R12 | Ar-4 | K-7 | 563.7 | Similar | 0.49 | A | B | B |
| Example 96 | R12 | Ar-22 | K-7 | 580.7 | Similar | 0.50 | A | B | B |
| Example 97 | R12 | Ar-7 | K-2 | 557.6 | Similar | 0.48 | A | B | B |
| Example 98 | R12 | Ar-9 | K-2 | 641.8 | Similar | 0.56 | A | B | B |
| Example 99 | R12 | Ar-10 | K-7 | 957.3 | Similar | 0.83 | B | B | B |
| Example 100 | R12 | Ar-11 | K-7 | 993.2 | Similar | 0.86 | B | B | B |
| Example 101 | R12 | Ar-21 | K-2 | 481.5 | Similar | 0.42 | A | B | B |
| Example 102 | R13 | Ar-13 | K-7 | 514.6 | Similar | 0.47 | A | B | B |
| Example 103 | R13 | Ar-14 | K-7 | 556.7 | Similar | 0.51 | A | B | B |
| Example 104 | R13 | Ar-22 | K-7 | 580.7 | Similar | 0.53 | A | B | B |
| Example 105 | R13 | Ar-7 | K-2 | 557.6 | Similar | 0.51 | A | B | B |
| Example 106 | R13 | Ar-9 | K-2 | 641.8 | Similar | 0.59 | A | B | B |
| Example 107 | R13 | Ar-10 | K-7 | 957.3 | Similar | 0.88 | B | B | B |
| Example 108 | R13 | Ar-11 | K-7 | 993.2 | Similar | 0.91 | B | B | B |
| Example 109 | R13 | Ar-3 | K-7 | 540.6 | Similar | 0.50 | A | B | B |
| Example 110 | R13 | Ar-21 | K-2 | 481.5 | Similar | 0.44 | A | B | B |
| Example 111 | R14 | Ar-13 | K-7 | 514.6 | Similar | 0.62 | A | B | B |
| Example 112 | R14 | Ar-14 | K-7 | 556.7 | Similar | 0.67 | A | B | B |
| Example 113 | R14 | Ar-4 | K-7 | 563.7 | Similar | 0.68 | A | B | B |
| Example 114 | R14 | Ar-22 | K-7 | 580.7 | Similar | 0.70 | A | B | B |
| Example 115 | R14 | Ar-7 | K-2 | 557.6 | Similar | 0.67 | A | B | B |
| Example 116 | R14 | Ar-9 | K-2 | 641.8 | Similar | 0.77 | B | B | B |
| Example 117 | R14 | Ar-3 | K-7 | 540.6 | Similar | 0.65 | A | B | B |

TABLE 9

| | Liquid crystal compound Ratio (wt %) | Non-liquid crystal compound Ar | Non-liquid crystal compound K | Non-liquid crystal compound Mw | Comparison of Ar cores | Ratio of molecular weight (molecular weight N/ molecular weight L) | Light resistance Front CR | Light resistance Tint change | Light resistance Phase difference change |
|---|---|---|---|---|---|---|---|---|---|
| Comparative Example 1 | Z-3 | Z-4 | | 888 | Similar | 1.06 | C | B | B |
| Comparative Example 2 | R1/R2/R3 (11/51/38) | — | | — | — | — | A | C | C |
| Comparative Example 3 | R1/R2/R3 (11/51/38) | Z-1 | | 225 | Different | 0.18 | C | B | B |
| Comparative Example 4 | R1/R2/R3 (11/51/38) | Z-2 | | 425 | Different | 0.34 | C | B | B |
| Comparative Example 5 | R4/R5/R15 (20/40/40) | — | | — | — | — | A | C | C |
| Comparative Example 6 | R6 | — | | — | — | — | A | C | C |
| Comparative Example 7 | R7 | — | | — | — | — | A | C | C |
| Comparative Example 8 | R8 | — | | — | — | — | A | C | C |
| Comparative Example 9 | R9 | — | | — | — | — | A | C | C |
| Comparative Example 10 | R10 | — | | — | — | — | A | C | C |
| Comparative Example 11 | R11 | — | | — | — | — | A | C | C |
| Comparative Example 12 | R12 | — | | — | — | — | A | C | C |
| Comparative Example 13 | R13 | — | | — | — | — | A | C | C |

The structures or the liquid crystal compound and the non-liquid crystal compound in Tables 5 to 9 above are shown below.

Furthermore, the non-liquid crystal compounds used in Examples 1 to 117 are compounds having the above-mentioned structures represented by Formulae Ar-1 to Ar-22 as Ar in Tables 5 to 9 above, and having the above-mentioned side chain structures represented by K-1 to K-58 as K in Tables 5 to 9 above.

Liquid Crystal Compound R1

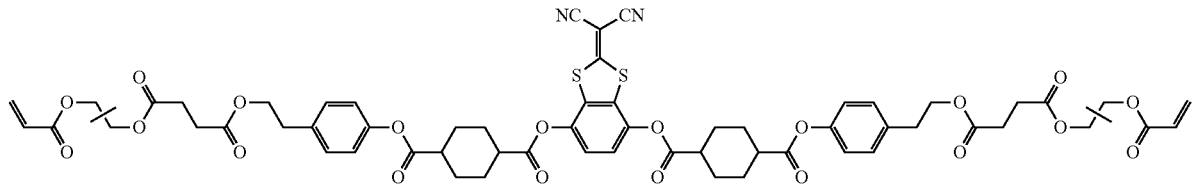

Liquid Crystal Compound R2

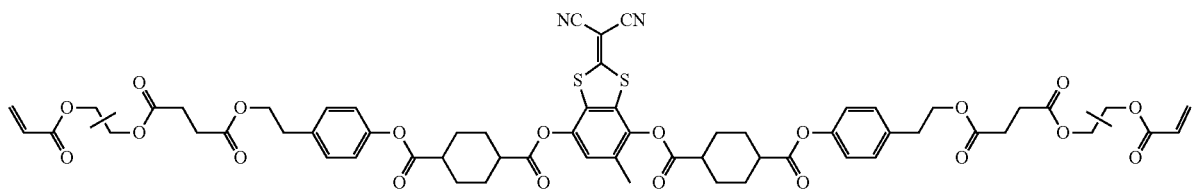

Liquid Crystal Compound R3

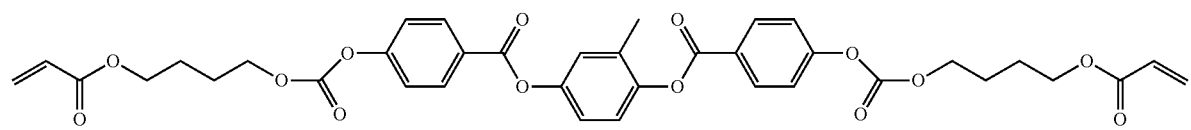 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Liquid Crystal Compound R4

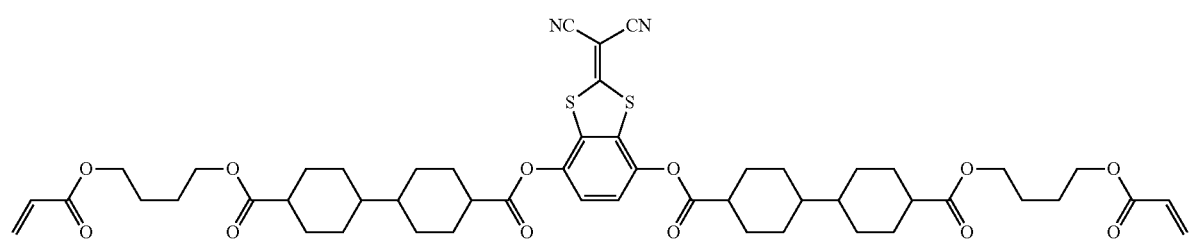 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

Liquid Crystal Compound R5

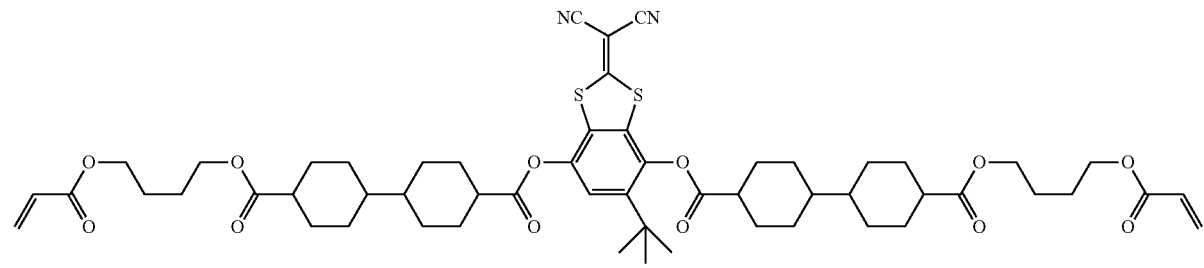 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Liquid Crystal Compound R6
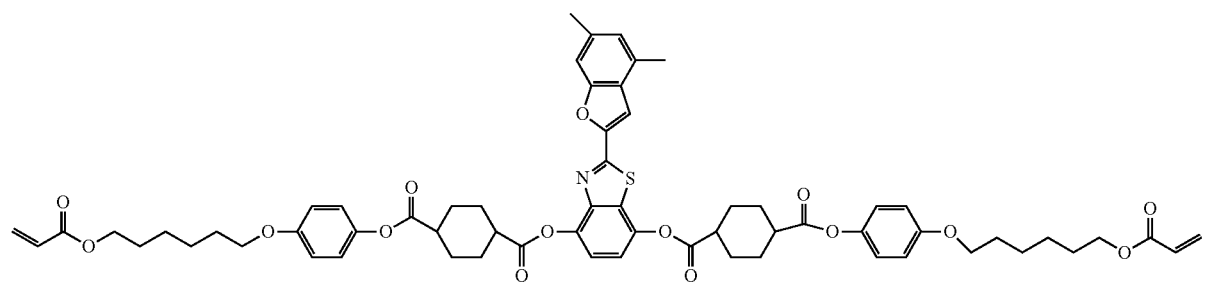 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c4sc(-c5nc6c(C)cc(C)cc6s5)nc34)CC2)cc1]
Liquid Crystal Compound R7
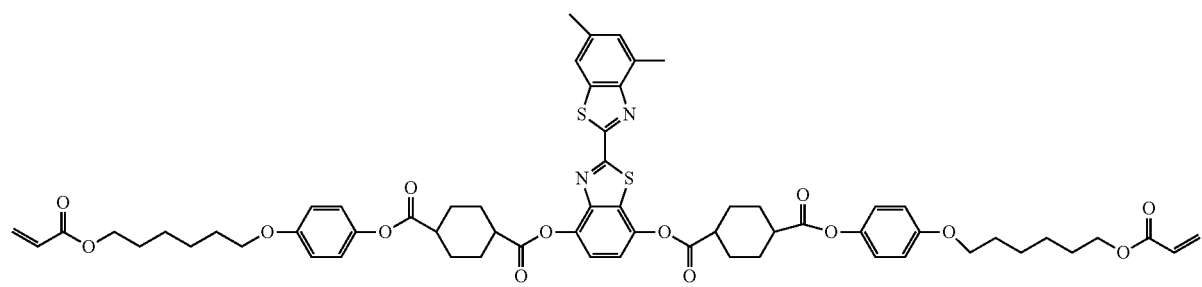
Liquid Crystal Compound R8
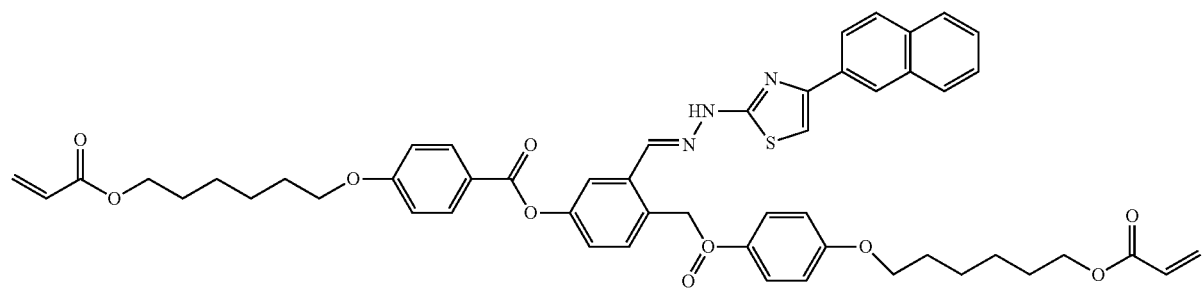
Liquid Crystal Compound R9
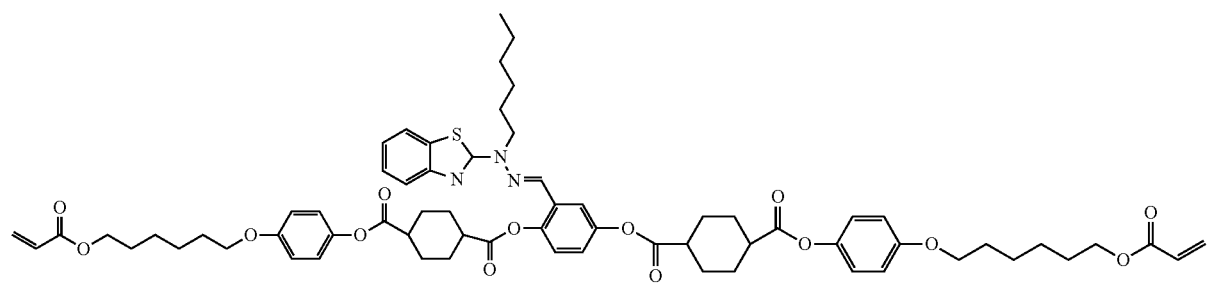 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c(/C=N/N(CCCCCC)C4Nc5ccccc5S4)c3)CC2)cc1]

Liquid Crystal Compound R10
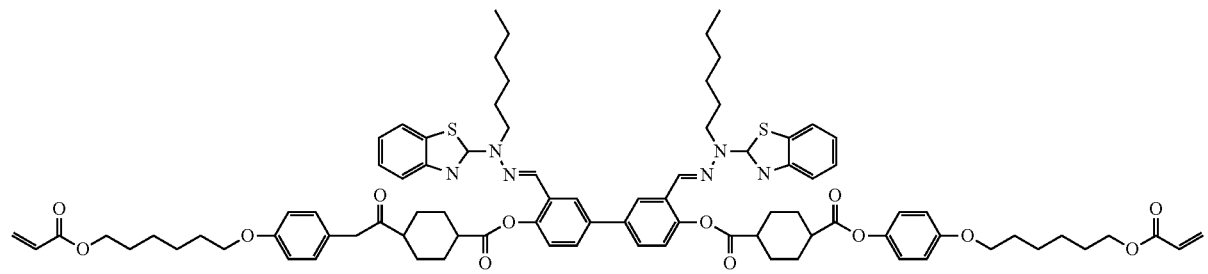 [SMILES: C=CC(=O)OCCCCCCOc1ccc(CC(=O)C2CCC(C(=O)Oc3ccc(-c4ccc(OC(=O)C5CCC(C(=O)Oc6ccc(OCCCCCCOC(=O)C=C)cc6)CC5)c(/C=N/N(CCCCCC)C5Nc6ccccc6S5)c4)cc3/C=N/N(CCCCCC)C3Nc4ccccc4S3)CC2)cc1]
Liquid Crystal Compound R11
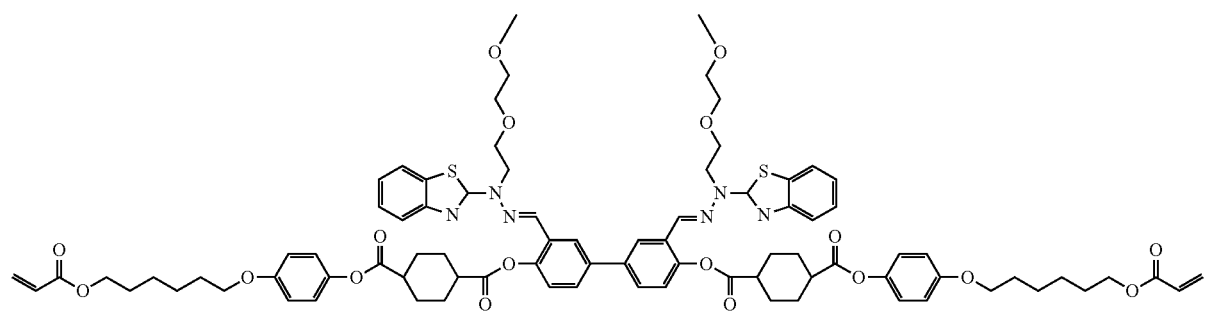 [SMILES: C=CC(=O)OCCCCCCOc1ccc(OC(=O)C2CCC(C(=O)Oc3ccc(-c4ccc(OC(=O)C5CCC(C(=O)Oc6ccc(OCCCCCCOC(=O)C=C)cc6)CC5)c(/C=N/N(CCOCCOC)C5Nc6ccccc6S5)c4)cc3/C=N/N(CCOCCOC)C3Nc4ccccc4S3)CC2)cc1]
Liquid Crystal Compound R12
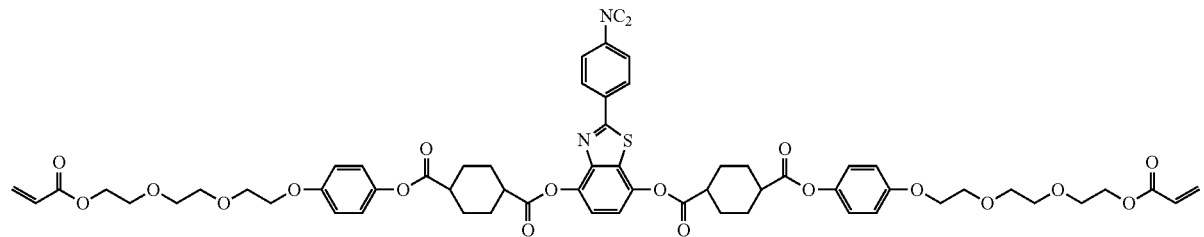
Liquid Crystal Compound R13
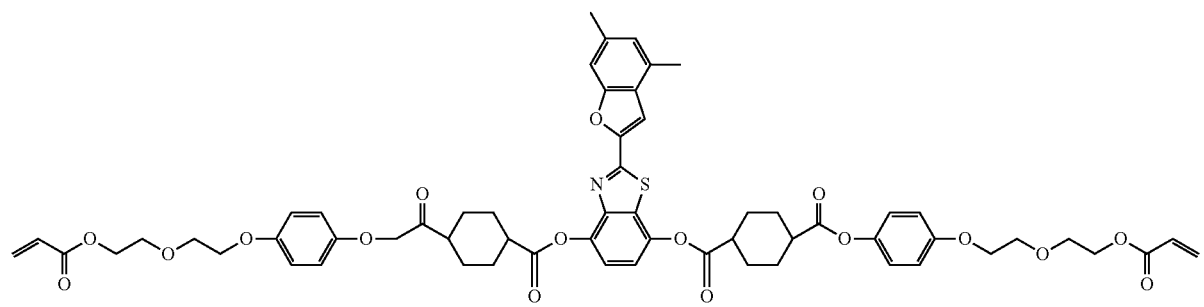 [SMILES: C=CC(=O)OCCOCCOc1ccc(OCC(=O)C2CCC(C(=O)Oc3ccc(OC(=O)C4CCC(C(=O)Oc5ccc(OCCOCCOC(=O)C=C)cc5)CC4)c4sc(-c5cc6c(C)cc(C)cc6o5)nc34)CC2)cc1]

Liquid Crystal Compound R14
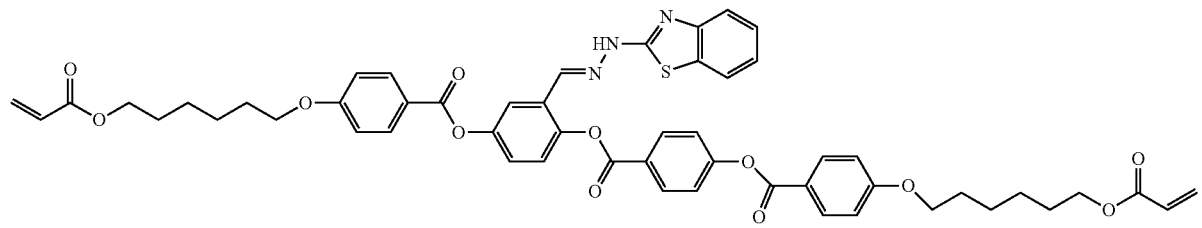 [SMILES: C=CC(=O)OCCCCCCOc1ccc(C(=O)Oc2ccc(C(=O)Oc3ccc(OC(=O)c4ccc(OCCCCCCOC(=O)C=C)cc4)cc3/C=N/Nc3nc4ccccc4s3)cc2)cc1]
Liquid Crystal Compound R15
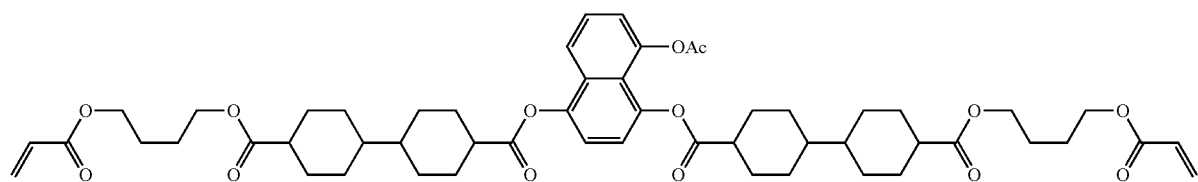 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c(OC(C)=O)cccc34)CC2)CC1]
Non-Liquid Crystal Compound Z-1
Non-Liquid Crystal Compound Z-2
Liquid Crystal Compound Z-3
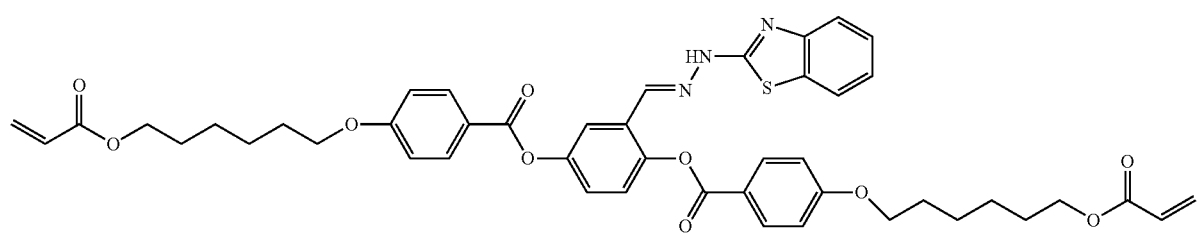 [SMILES: C=CC(=O)OCCCCCCOc1ccc(C(=O)Oc2ccc(OC(=O)c3ccc(OCCCCCCOC(=O)C=C)cc3)c(/C=N/Nc3nc4ccccc4s3)c2)cc1]

Non-Liquid Crystal Compound Z-4

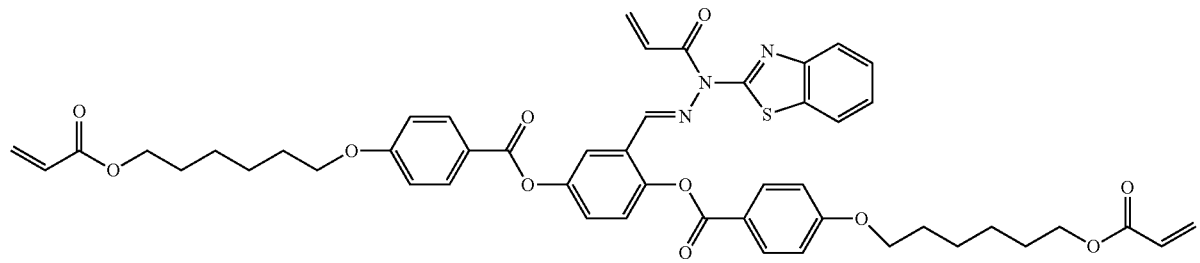 [SMILES: C=CC(=O)OCCCCCCOc1ccc(C(=O)Oc2ccc(OC(=O)c3ccc(OCCCCCCOC(=O)C=C)cc3)c(/C=N/N(C(=O)C=C)c3nc4ccccc4s3)c2)cc1]

From the results shown in Tables 5 to 9 above, it was found that in a case where the non-liquid crystal compound was not blended, the light resistance of an optically anisotropic layer formed was deteriorated (Comparative Examples 2 and 5 to 13).

In addition, it was found that even in a case of performing the blending with a non-liquid crystal compound, in a case where any of aromatic rings (Ar cores) selected from the group consisting of the above-mentioned groups represented by Formulae (Ar-1) to (Ar-7) was not contained or in a case where a ratio of the molecular weight of the non-liquid crystal compound to the molecular weight of the liquid crystal compound was more than 1, the light resistance of an optically anisotropic layer thus formed was improved, but the contrast of an image display device was deteriorated (Comparative Examples 1, 3, and 4).

In contrast, it was found that in a case where both of the liquid crystal compound and the non-liquid crystal compound are compounds having an Ar core and the ratio of the molecular weight of the non-liquid crystal compound to the molecular weight of the liquid crystal compound is 1 or less, the light resistance of an optically anisotropic layer thus formed is improved and the contrast of an image display device is also improved (Examples 1 to 117).

In particular, from the comparison between Examples, it was found that in a case where the Ar core of the liquid crystal compound and the Ar core of the non-liquid crystal compound have the same structure, the light resistance of an optically anisotropic layer thus formed is improved.

Furthermore, from the comparison of Examples 1 to 6, it was found that in a case where the ratio of the molecular weight of the non-liquid crystal compound to the molecular weight of the liquid crystal compound is 0.7 or less, the contrast of an image display device is improved.

In addition, from the comparison of Examples 1 to 5, it was found that in a case where the non-liquid crystal compound is represented by Formula (II), in an aspect in which g3 and g4 in Formula (II) are 0, and $D^{11}$ and $D^{12}$ are single bonds, an aspect in which $G^3$ and $G^4$ in Formula (II) each independently represent a divalent alicyclic hydrocarbon group having 5 to 20 carbon atoms, which may have a substituent, and an aspect in which $G^3$ and $G^4$ in Formula (II) each independently represent an aromatic ring having 6 to 20 carbon atoms, which may have a substituent, and $D^9$ and $D^{10}$ each independently represent a divalent linking group including at least —$CR^1R^2$—, the contrast of an image display device is further improved.

EXPLANATION OF REFERENCES

10: optical film
12: optically anisotropic layer
14: alignment film
16: support

What is claimed is:
1. A liquid crystal composition comprising:
a liquid crystal compound; and
a non-liquid crystal compound,
wherein both of the liquid crystal compound and the non-liquid crystal compound are compounds having any of aromatic rings selected from the group consisting of groups represented by Formulae (Ar-1) to (Ar-7),
wherein the non-liquid crystal compound is a compound represented by Formula (IIa):

$$L^5\text{-}SP^5\text{-}D^9\text{-}[Ar\text{-}D^{10}]_{q2}\text{-}SP^6\text{-}L^6 \quad \text{(IIa), and}$$

a ratio of a molecular weight of the non-liquid crystal compound to a molecular weight of the liquid crystal compound is 1 or less,

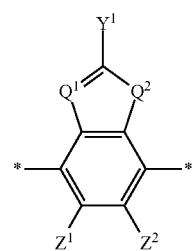

(Ar-1)

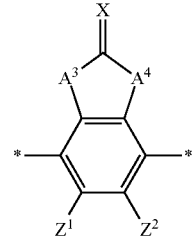

(Ar-2)

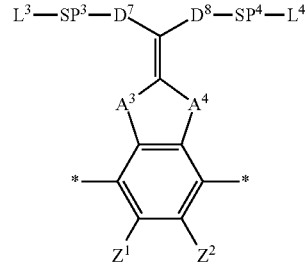

(Ar-3)

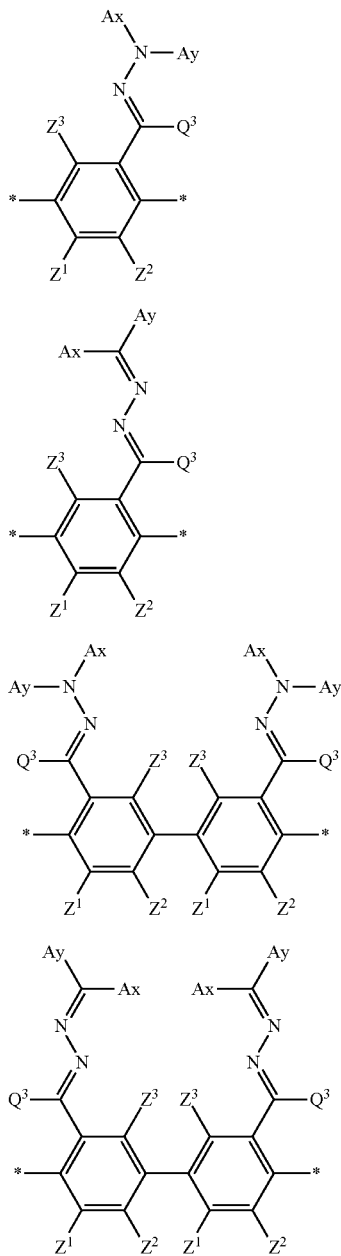

wherein, in Formulae (Ar-1) to (Ar-7),
* represents a bonding position,
$Q^1$ represents N or CH,
$Q^2$ represents —S—, —O—, or —N($R^6$)—, where $R^6$ represents a hydrogen atom or an alkyl group having 1 to 6 carbon atoms,
$Y^1$ represents an aromatic hydrocarbon group having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —$CH_2$—'s constituting the alicyclic hydrocarbon group may be substituted with —O—, —S—, or —NH—,
$Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 6 to 20 carbon atoms, a halogen atom, a cyano group, a nitro group, —$OR^7$, —$NR^8R^9$, —$SR^{10}$, —$COOR^{11}$, or —$COR^{12}$, $R^7$ to $R^{12}$ each independently represent a hydrogen atom or an alkyl group having 1 to 6 carbon atoms, and $Z^1$ and $Z^2$ may be bonded to each other to form an aromatic ring,
$A^3$ and $A^4$ each independently represent a group selected from the group consisting of —O—, —N($R^{13}$)—, —S—, and —CO—, where $R^{13}$ represents a hydrogen atom or a substituent,
X represents a non-metal atom of Groups XIV to XVI to which a hydrogen atom or a substituent may be bonded,
$D^7$ and $D^8$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms,
$SP^3$ and $SP^4$ each independently represent a single bond, a linear alkylene group having 1 to 12 carbon atoms, a branched alkylene group having 3 to 12 carbon atoms or a divalent linking group in which one or more of —$CH_2$—'s constituting the linear or branched alkylene group are substituted with —O—, —S—, —NH—, —N(Q)-, or —CO—, where Q represents a substituent,
$L^3$ and $L^4$ each independently represent a monovalent organic group,
Ax represents an organic group having 2 to 30 carbon atoms, which has at least one aromatic ring selected from the group consisting of an aromatic hydrocarbon ring and an aromatic heterocyclic ring,
Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring,
the aromatic ring in each of Ax and Ay may have a substituent, and Ax and Ay may be bonded to each other to form a ring, and
$Q^3$ represents a hydrogen atom or an alkyl group having 1 to 20 carbon atoms, which may have a substituent; and
wherein, in Formula (IIa),
q2 represents 1 or 2,
$D^9$ and $D^{10}$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms, provided that in a case where q2 is 2, a plurality of $D^{10}$'s may be the same as or different from each other,
$SP^5$ and $SP^6$ each independently represent a single bond, a linear alkylene group having 1 to 12 carbon atoms, a branched alkylene group having 3 to 12 carbon atoms or a divalent linking group in which one or more of —$CH_2$—'s constituting the linear or branched alkylene group are substituted with —O—, —S—, —NH—, —N(Q)-, or —CO—, where Q represents a substituent, $L^5$ and $L^6$ each independently represent a monovalent organic group, and Ar represents any of aromatic rings selected from the group consisting of groups represented by Formulae (Ar-1) to (Ar-7), provided that in a case where q2 is 2, a plurality of Ar's may be the same as or different from each other.

2. The liquid crystal composition according to claim 1, wherein the ratio of the molecular weight of the non-liquid crystal compound to the molecular weight of the liquid crystal compound is less than 1.

3. The liquid crystal composition according to claim 1, wherein the liquid crystal compound has reverse wavelength dispersibility.

4. The liquid crystal composition according to claim 1, wherein the liquid crystal compound is a compound represented by Formula (I),

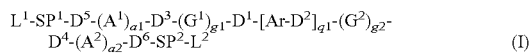

$\text{L}^1\text{-SP}^1\text{-D}^5\text{-}(A^1)_{a1}\text{-D}^3\text{-}(G^1)_{g1}\text{-D}^1\text{-}[Ar\text{-}D^2]_{q1}\text{-}(G^2)_{g2}\text{-}D^4\text{-}(A^2)_{a2}\text{-D}^6\text{-SP}^2\text{-L}^2$ (I)

in Formula (I), a1, a2, g1, and g2 each independently represent 0 or 1, provided that at least one of a1 or g1 represents 1, and at least one of a2 or g2 represents 1, q1 represents 1 or 2, $D^1$, $D^2$, $D^3$, $D^4$, $D^5$, and $D^6$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms, provided that in a case where q1 is 2, a plurality of $D^2$'s may be the same as or different from each other, $G^1$ and $G^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—, $A^1$ and $A^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—, $SP^1$ and $SP^2$ each independently represent a single bond, a linear alkylene group having 1 to 12 carbon atoms, a branched alkylene group having 3 to 12 carbon atoms or a divalent linking group in which one or more of —$CH_2$—'s constituting the linear or branched alkylene group are substituted with —O—, —S—, —NH—, —N(Q)-, or —CO—, where Q represents a substituent, $L^1$ and $L^2$ each independently represent a monovalent organic group, and at least one of $L^1$ or $L^2$ represents a polymerizable group, provided that in a case where Ar is an aromatic ring represented by Formula (Ar-3), at least one of $L^1$ or $L^2$, or $L^3$ or $L^4$ in Formula (Ar-3) represents a polymerizable group, and Ar represents any of aromatic rings selected from the group consisting of groups represented by Formulae (Ar-1) to (Ar-7), provided that in a case where q1 is 2, a plurality of Ar's may be the same as or different from each other.

5. The liquid crystal composition according to claim 1, wherein $D^9$ and $D^{10}$ in Formula (IIa) each independently represent a divalent linking group including at least-$CR^1R^2$—, here, $R^1$ and $R^2$ each independently represent a hydrogen atom, a fluorine atom, or an alkyl group having 1 to 12 carbon atoms.

6. The liquid crystal composition according to claim 1, wherein $D^9$ and $D^{10}$ in Formula (IIa) each independently represent —CO—, —O—, —S—, or a divalent linking group consisting of a combination of two or more of these groups.

7. The liquid crystal composition according to claim 1, wherein $SP^5$ and $SP^6$ in Formula (IIa) each represent a linear alkylene group having 1 to 12 carbon atoms, a branched alkylene group having 3 to 12 carbon atoms or a divalent linking group in which one or more of —$CH_2$—'s constituting the linear or branched alkylene group are substituted with —O—.

8. The liquid crystal composition according to claim 1, wherein both of $L^5$ and $L^6$ in Formula (IIa) represent polymerizable groups.

9. The liquid crystal composition according to claim 1, wherein any of aromatic rings selected from the group consisting of groups represented by Formulae (Ar-1) to (Ar-7) contained in the liquid crystal compound and any of aromatic rings selected from the group consisting of groups represented by Formulae (Ar-1) to (Ar-7) contained in the non-liquid crystal compound have the same structure.

10. The liquid crystal composition according to claim 1, wherein the ratio of the molecular weight of the non-liquid crystal compound to the molecular weight of the liquid crystal compound is 0.7 or less.

11. The liquid crystal composition according to claim 1, wherein both of the liquid crystal compound and the non-liquid crystal compound are compounds having any of aromatic rings selected from the group consisting of groups represented by Formulae (Ar-1) to (Ar-3).

12. An optically anisotropic layer, comprising the liquid crystal composition according to claim 1, which has been cured.

13. An optical film comprising the optically anisotropic layer according to claim 12.

14. A polarizing plate comprising:
the optical film according to claim 13; and
a polarizer.

15. An image display device comprising the optical film according to claim 13.

16. An image display device comprising the polarizing plate according to claim 14.

17. The liquid crystal composition according to claim 2, wherein the liquid crystal compound has reverse wavelength dispersibility.

* * * * *